(12) United States Patent
Grunkemeyer et al.

(10) Patent No.: US 7,280,558 B1
(45) Date of Patent: Oct. 9, 2007

(54) ASYNCHRONOUS PATTERN

(75) Inventors: Brian M. Grunkemeyer, Issaquah, WA (US); Jonathan C. Hawkins, Seattle, WA (US); Christopher W. Brumme, Mercer Island, WA (US); Gopala Krishna R. Kakivaya, Sammamish, WA (US); Lance E. Olson, Sammamish, WA (US); Dmitry Robsman, Bellevue, WA (US); Henry L. Sanders, II, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1197 days.

(21) Appl. No.: 09/893,805

(22) Filed: Jun. 28, 2001

(51) Int. Cl.
*H04J 3/16* (2006.01)

(52) U.S. Cl. .................. 370/466; 370/462; 370/401; 709/101; 709/203; 709/201; 709/223; 707/100; 707/102; 707/104; 707/104.1

(58) Field of Classification Search ........ 707/100–104, 707/104.1; 709/101, 203, 201, 223, 230, 709/300–304
See application file for complete search history.

(56) References Cited

U.S. PATENT DOCUMENTS

| | | | | |
|---|---|---|---|---|
| 5,640,556 A | * | 6/1997 | Tamura ..................... | 707/10 |
| 5,666,362 A | * | 9/1997 | Chen et al. ................. | 370/420 |
| 5,848,234 A | * | 12/1998 | Chernick et al. ........... | 709/203 |
| 5,958,004 A | * | 9/1999 | Helland et al. ............. | 718/101 |
| 5,987,517 A | * | 11/1999 | Firth et al. .................. | 709/230 |
| 5,999,987 A | | 12/1999 | O'Farrell, et al. .......... | 709/304 |
| 6,012,081 A | * | 1/2000 | Dorn et al. ................. | 718/102 |
| 6,253,252 B1 | * | 6/2001 | Schofield ................... | 719/315 |
| 6,275,871 B1 | * | 8/2001 | Reinfelder et al. ......... | 719/328 |
| 6,401,099 B1 | * | 6/2002 | Koppolu et al. ........ | 707/103 R |
| 6,529,962 B1 | * | 3/2003 | Azagury et al. ............ | 719/330 |
| 6,553,438 B1 | * | 4/2003 | Coffman et al. ............. | 710/52 |
| 6,591,272 B1 | * | 7/2003 | Williams .................... | 707/102 |
| 6,618,703 B1 | * | 9/2003 | Peres et al. ................. | 704/270 |
| 6,779,180 B1 | * | 8/2004 | Palm .......................... | 718/100 |
| 6,853,852 B1 | * | 2/2005 | Park et al. .................. | 455/561 |
| 6,901,554 B1 | * | 5/2005 | Bahrs et al. ................ | 715/526 |

(Continued)

OTHER PUBLICATIONS

David A. Solomon, et al., Inside Microsoft Windows 2000 Third Edition, 2000, pp. 587-588, 604-605, Microsoft Press, Redmond WA.

(Continued)

*Primary Examiner*—Edan Orgad
*Assistant Examiner*—Andrew C. Lee
(74) *Attorney, Agent, or Firm*—Amin, Turocy & Calvin, LLP

(57) ABSTRACT

A system and method for converting code associated with synchronous method calls to code that can be employed to perform asynchronous method calls and for supporting such asynchronous method calls is provided. The system includes a pattern generator that can break code for a synchronous method call into one or more constituent parts including a begin asynchronous operation method, an end asynchronous operation method, an asynchronous call state object and an asynchronous call result object. The system includes a pattern data store that holds data associated with converting a synchronous method call to an asynchronous method call, which facilitates employing the system consistently across environments like file input/output, stream input/output, socket input/output, networking, remoting channels, proxies, web forms, web services and messaging message queues.

17 Claims, 16 Drawing Sheets

U.S. PATENT DOCUMENTS

| | | | |
|---|---|---|---|
| 6,901,596 B1* | 5/2005 | Galloway | 719/330 |
| 6,934,948 B2* | 8/2005 | Mikalsen et al. | 718/101 |
| 2001/0020243 A1* | 9/2001 | Koppolu et al. | 707/513 |
| 2002/0004850 A1* | 1/2002 | Sudarshan et al. | 709/313 |

OTHER PUBLICATIONS

Hasselbring, Wilhelm: "*Programming Languages and Systems for Prototyping Concurrent Applications*". *ACM Computing Surveys*, vol. 32, No. 1, Mar. 2000, p. 43-79.

\* cited by examiner

Prior Art Fig. 2

ASYNCHRONOUS PATTERN

TECHNICAL FIELD

The present invention relates generally to asynchronous method calling and more particularly to a system and method for making asynchronous calls using a common pattern.

BACKGROUND OF THE INVENTION

Conventional synchronous method calls, where the caller blocks until the completion of processing performed by the callee, may provide unsatisfactory results in some calling situations. By way of illustration, if the callee takes a long time to complete, the caller may be blocked for an unacceptable period of time waiting for the callee to return. Thus, resources (e.g., memory, processor cycles) associated with a blocked caller thread may be unavailable for other threads, reducing system performance. By way of further illustration, if the caller desires to make multiple calls to one or more callees, where, from the caller's point of view, such calls can be performed substantially in parallel, conventional synchronous method calling techniques may generate an unwanted, substantially serial performance.

Conventionally, synchronous calls can cause a thread to block. Threads are computationally and memory expensive. Therefore, having threads blocked can negatively impact system performance. It would be preferable to allow threads to enter a state (e.g., run to completion) where the resource can be freed, and thus reallocated, rather than being consumed by a blocked thread.

Due, at least in part, to undesired blocking, undesired resource consumption and undesired serial performance results from synchronous method calling a number of asynchronous method calling techniques have developed. Such asynchronous techniques are, in general, narrowly tailored to provide asynchronous calling capability for a specific programmatic situation. Such diverse, individually tailored asynchronous method calling techniques do not, in general, provide an efficient model to deal with asynchronous operations via a consistent programming model. Furthermore, objects employing such individually tailored asynchronous method calling techniques may require reprogramming to support asynchronous behavior. Such reprogramming may not be possible for existing objects, and thus it may be difficult, or impossible, to add asynchronous behavior to such existing objects.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Conventionally, synchronous method calls can cause a thread to block. Asynchronous calls typically do not lead to threads blocking. Greater processing efficiency can be achieved if threads can enter a state (e.g., run to completion) where resources associated with the thread can be freed, and thus reallocated, rather than being consumed by a blocked thread. Thus, in various contexts, asynchronous calls are employed in place of synchronous calls. Therefore, call sequences generated by the present invention facilitate reducing the likelihood that a thread will block by facilitating asynchronous calls, whereby a thread can cause a target method on a server to be invoked without having to synchronously wait for the call to complete. By way of illustration, a client may request ten images for a web page. Conventionally, if such requests are made by one thread, then the thread may generate ten synchronous calls, where the single thread blocks ten times while waiting for the images. This can negatively impact system performance. Similarly, if ten separate threads are employed to make the ten synchronous calls, ten threads may be blocked, consuming system resources and again negatively impacting system performance. By employing asynchronous calls that are facilitated by the present invention, one thread can make ten asynchronous calls without incurring ten separate call/block/return/wake up sequences.

By establishing a callback routine during the begin asynchronous portion of a synchronous call, where the callback routine can be invoked by a target method upon its completion, the present invention facilitates a first thread beginning the asynchronous call (and then running to completion without blocking due to the method call) and a second thread finishing the asynchronous call (and similarly running to completion without blocking due to the method call). Thus, resources consumed by blocked threads are reduced, providing advantages over conventional systems.

The present invention provides a system and method for converting synchronous calls to asynchronous calls using a common pattern. The pattern breaks a regular synchronous call into constituent parts, including, but not limited to, a begin operation, an end operation and a result and/or state object. The state object can be employed to obtain status concerning the asynchronous call while the result object can be employed to facilitate passing results to a caller. In one example of the present invention, a callback routine may be established by the begin operation. The callback routine can be invoked when the call completes and can be employed to trigger end operation processing.

The present invention further permits a caller to determine whether a particular call should be asynchronous without requiring the called object to perform additional programming to support the asynchronous behavior of a calling client. A called object may naively provide wrappers to expose an asynchronous view of a synchronous operation (potentially leveraging existing asynchronous features such as blocking and asynchronous delegates). A delegate object contains information employed in calling a specific method on a specific object. Conceptually, a delegate can be treated as a smart method pointer. A callback method is an example of a delegate. A called object, may, however, decide to implement support for asynchronous behavior and thus perform additional programming (e.g., for efficiency reasons). If such a called object implements support for asynchronous behavior in accordance with the asynchronous pattern provided by the present invention, then further improvements in performance may be experienced.

Threads that employ the present invention to make asynchronous calls have options available for monitoring completion of the asynchronous operation. For example, a client may perform actions including, but not limited to, polling a property in the state object to determine whether asynchronous operation has completed, attempt to complete the operation prematurely (and thereby block until the operation completes), wait on a result object where periodic timeouts can be employed to wakeup and monitor the result and completing the operation inside an asynchronous callback routine (executed by the called object when the operation is finished).

Thus, the present invention provides an efficient model to employ asynchronous operations via a consistent programming model that can be employed in diverse application environments. Once a developer understands how to employ the asynchronous pattern in one area (e.g., I/O classes), then the developer can employ the asynchronous pattern in other areas (e.g., network classes, messaging classes, remote client/server communication classes, printing classes, web classes, forms classes, XML classes, delegates). Thus, the present invention makes it more likely that programmers will expend the time and energy to learn the asynchronous pattern.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWING

Prior Art

DETAILED DESCRIPTION OF THE INVENTION

Figure 1:
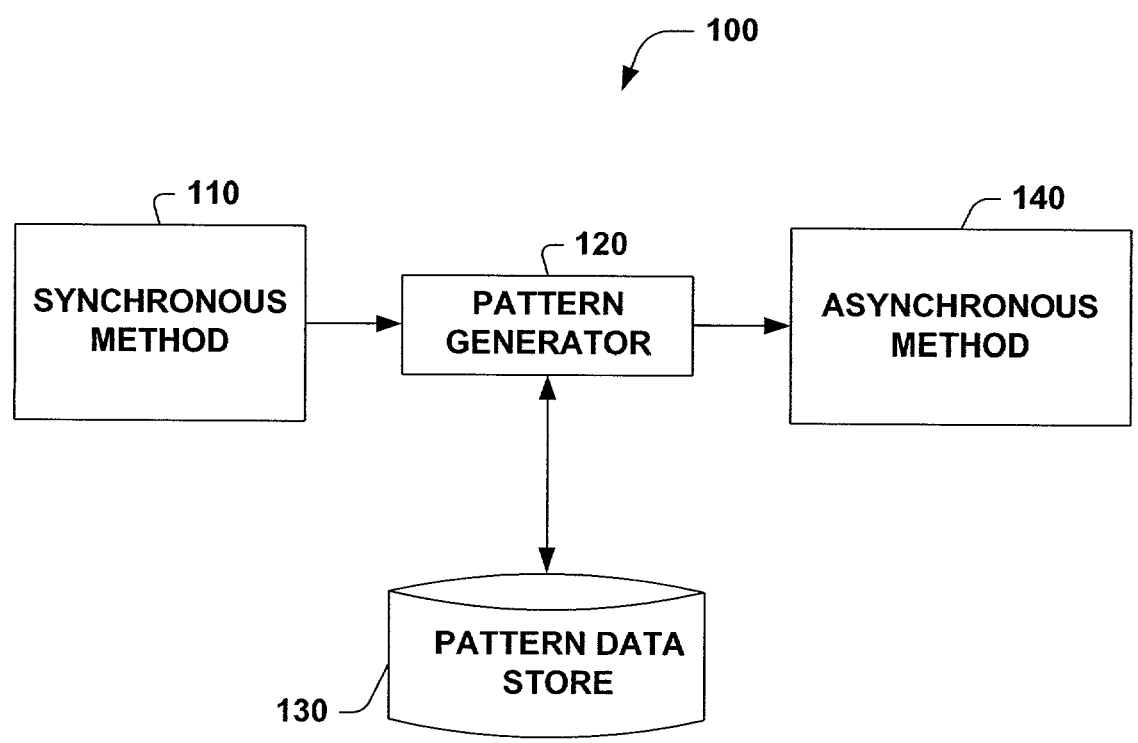
FIG. 1 is a schematic block diagram illustrating the conversion of a synchronous method call to an asynchronous method call by employing a pattern generator, in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component.

Concerning interfaces, classes not related by inheritance may, nevertheless, share common functionality. For example, many classes may contain methods for saving their state to and from permanent storage. For this purpose, classes not related by inheritance may support interfaces allowing programmers to code for the classes' shared behavior based on their shared interface type and not their exact types. Thus, as used in this application, the term "interface" refers to a partial specification of a type. It is a contract that binds implementers to provide implementations of the methods contained in the interface. Object types may support many interface types, and many different object types would normally support an interface type. By definition, an interface type can never be an object type or an event type. Interfaces may extend other interface types. Thus, an interface may contain methods (both class and instance), static fields, properties and events. However, unlike an object, an interface cannot contain instance fields.

It is to be appreciated that various aspects of the present invention may employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks) may be employed.

Referring initially to FIG. 1, a system 100 for converting a synchronous method call 110 on a target method to an asynchronous method call 140 is illustrated. The system 100 includes a pattern generator 120 that can break the synchronous method call 110 into one or more constituent parts (e.g., a begin asynchronous operation method, an end asynchronous operation method, an asynchronous call state object, an asynchronous call result object) and a pattern data store 130 that stores data associated with converting the synchronous method call 110 to the asynchronous method call 140. By employing the pattern generator 120 and the data stored in the pattern data store 130 the present invention facilitates the caller of a method deciding whether a particular call should be asynchronous and mitigates the need for a called object to be reprogrammed for supporting asynchronous behavior by its clients, providing advantages over conventional systems where it is typically the called object that determines whether it will proceed synchronously or asynchronously.

The pattern generator 120 may be a computer-related entity, either hardware, a combination of hardware and software, software, or software in execution. For example, the pattern generator 120 may be, but is not limited to being, a process running on a processor, a processor, an object, an executable, a thread of execution, a program, and a computer. In one example of the present invention, the pattern generator 120 is implemented in a compiler.

The pattern data store 130 may be implemented in one or more stand-alone and/or distributed, co-operating data structures including, but not limited to, lists, linked lists, arrays, records, tables, databases, data cubes, heaps and stacks. The data stored in the pattern data store 130 includes, but is not limited to, thread pool information (e.g., name, location, state), delegate information (e.g., names, locations, states, capabilities), wait handler information (e.g., object reference, state), syntax rules (e.g., naming conventions) and semantic rules (e.g., constituent parts lists).

Conventionally, a target method is passed parameters that can include, but are not limited to, input parameters, input/ output parameters, output parameters and by reference parameters. Thus, in one example of the present invention, a begin asynchronous operation method generated by the pattern generator 120 accepts inputs including input parameters presented to the target method, input/output parameters presented to the target method and parameters passed by reference to the target method. Furthermore, to facilitate invoking processing associated with ending the asynchronous call, the begin asynchronous operation method also accepts the address of an asynchronous callback routine that can be invoked when the target method completes. To facilitate tracking and logging state objects associated with the asynchronous call and the target method, the begin asynchronous operation method also accepts an asynchronous call state object as an input. In the example, the begin asynchronous operation method returns the asynchronous result object as an output to the process and/or thread that called the begin asynchronous operation method. Thus, the caller of the begin asynchronous operation method can supply information to the invoker via a waitable object, which is a synchronization object that can be employed to facilitate performing processing at a desired time (e.g., in a callback routine that waited for a target method to complete).

In one example of the present invention an end asynchronous operation method generated by the pattern generator 120 can similarly accept inputs including input/output parameters presented to the target method, output parameters presented to the target method, parameters passed by reference to the target method and the asynchronous call result object. The end asynchronous operation method will then return a type consistent with the return type of the target method.

An asynchronous call result object generated by the pattern generator 120 may have fields including, but not limited to a first field for recording whether the begin asynchronous operation completed asynchronously and a second field for recording whether a server completed processing the target method. To facilitate controlling when processing associated with ending asynchronous operations is to be performed, the asynchronous call result object may be a waitable object.

To facilitate making the pattern provided by the present invention available in a variety of contexts, and thus provide uniformity advantages over conventional systems, in one example of the present invention, the asynchronous call result object implements an interface with methods that include, but are not limited to, an asynchronous call state object get method, a wait handler object get method, a synchronous call completed field get method and a target method call completed field get method. Thus, the pattern may be employed in contexts including, but not limited to, file input/output, stream input/output, socket input/output, networking, remoting channels (employed to transport messages to and from remote objects), proxies, printing, web forms, web services and messaging message queues.

An example of a class (PrimeFactorizer) from which objects that conventionally would be called synchronously, and code that employs the pattern to facilitate calling the objects asynchronously illustrates methods and objects described above.

The class PrimeFactorizer factors a number into its two prime factors.

```
public class PrimeFactorizer
{
    // method Factorize returns a boolean true if the input
parameter factorizableNum can
    // be factorized, otherwise, returns a boolean false if
factorizableNum is prime
    // if factorizableNum can be factored, factors are placed in
primefactor1 and 2
    // method may take a long time to complete, therefore, the
present invention can
    // break this call down into constituent parts (e.g., begin,
end, state/result object(s)
    public bool Factorize(int factorizableNum, ref int primefactor1, ref int primefactor2)
    {
        // determine whether factorizableNum is prime
        // if factorizable, return true and place factors in primefactor1 and primefactor2
        // if prime, return false
    }
}
```

It will be apparent to one skilled in the art that in certain situations (e.g., large input number) objects of the class PrimeFactorizer may take a substantial amount of time to compute. Thus, being able to call such an object asynchronously, and thus being able to avoid blocking while waiting for the processing to complete can provide advantages over conventional systems where such synchronous to asynchronous conversion is not possible. For example, threads may be allowed to run to completion without blocking and resources that would otherwise be consumed by such blocked threads may be freed to produce performance improvements. The following code, generated by a compiler configured to operate in accordance with the present invention, illustrates a caller employing the present invention to define a pattern for invoking the Factorize method asynchronously:

// Define a delegate public delegate bool FactorizingCallback(
   int factorizableNum,
   ref int primefactor1,
   ref int primefactor2);

// Create an instance of the Factorizer

PrimeFactorizer pf = new PrimeFactorizer( );

// Create a delegate on the Factorize method on the Factorizer

FactorizingCallback fd = new FactorizingCallback(pf.Factorize);

When a compiler that operates in accordance with the present invention emits the FactorizingCallback delegate class after parsing its definition, it will generate BeginInvoke and EndInvoke methods in addition to an Invoke method. For example:

public class FactorizingCallback : delegate
{
   // this is one of the constituent parts, a synchronous method for
   // calling the target method of the delegate
   public bool Invoke(
   int factorizableNum,
   ref int primefactor1,
   ref int primefactor2);
   // this is another of the constituent parts, the method that can be employed
   // to begin asynchronous operations, possibly queued via a threadpool
   // this method takes inputs from a calling client and kicks off asynchronous operations
   // it can also establish the callback delegate to call when asynchronous operation
   // is complete this method returns a waitable object that implements an
   // interface (e.g., IAsyncResult) that can be used by the calling client to determine
   // state and/or results associated with the asynchronous call
   public IAsyncResult BeginInvoke(
   int factorizableNum,
   ref int primefactor1,
   ref int primefactor2,
   AsyncCallback cb,
   Object AsyncState
   );
   // this is another of the constituent parts, the method that can be employed
   // to end asynchronous operations
   // this method accepts results from the target method and returns the type associated
   // with the target method signature
   public bool EndInvoke(
   ref int primefactor1,
   ref int primefactor2,
   IAsyncResult ar);
}

Thus, the synchronous call, which would cause a compiler to generate an invoke method, has been broken down into constituent parts (e.g., a begin invoke method, an end invoke method, a state object and a result object). While one specific example of the constituent parts and related objects (e.g., Invoke, public IAsyncResult BeginInvoke, EndInvoke, Object AsyncState, and IAsyncResult ar) with specific syntax are illustrated above, it is to be appreciated that the examples are merely illustrative, and not limiting, and that different compilers and/or different pattern generators 120 may produce constituent parts with different syntax and/or styles.

One input supplied to the BeginInvoke method illustrated above was the address of a callback routine. Such a callback routine can be employed by one example of the present invention to facilitate processing associated with ending the asynchronous call. For example, the callback routine can be invoked when the target method (e.g., Factorize) has completed. The following code demonstrates a client-side programming model for invoking the Factorize method asynchronously.

// This example class receives the results of the Async call on a callback using System;

using System.Runtime.Remoting;

public delegate bool FactorizingCallback(
   int factorizableNum,
   ref int primefactor1,
   ref int primefactor2);

// Class ProcessFactorizedNumber receives a callback when the results are available public class ProcessFactorizedNumber
{
   private int _ulNumber;
   public ProcessFactorizedNumber(int number)
   { _ulNumber = number; }
   public void FactorizedResults(IAsyncResult ar)
   {
   int factor1=0, factor2=0;
   // Extract the delegate from the AsyncResult
   FactorizingCallback fd = (FactorizingCallback) ((AsyncResult)ar).AsyncDelegate;
   fd.EndInvoke(ref factor1, ref factor2, ar); // obtain the result
   Console.WriteLine("On CallBack: Factors of {0} : {1} {2}", _ulNumber,
   factor1, factor2); // output the results
   } // end FactorizedResults
} // end ProcessFactorizedNumber With the class ProcessFactorizedNumber described above, two possible variations of calling the method are provided below. While two such variations are illustrated, it is to be appreciated that a greater and/or lesser number of calling methods may be employed in accordance with the present invention. In the first example, Async Variation 1, a valid callback routine address is established and passed to the begin asynchronous operation method, and thus the callback routine can be employed to invoke the processing associated with ending the asynchronous call. In the second example, Async Variation 2, no such valid callback address is passed to the begin asynchronous operation method, thus the caller employs a different technique, waiting on the result object, to determine when the target method has completed.

```
// Async Variation 1
// begin asynchronous method
// ProcessFactorizedNumber.FactorizedResults callback is called when call completes.
public void FactorizeNumber1( )
{
    // Client code
    PrimeFactorizer pf = new PrimeFactorizer( );
    FactorizingCallback fd = new FactorizingCallback(pf.Factorize);
    int factorizableNum = 1000589023, temp=0;
    // Create an instance of the class that is going to called when the call completes
    ProcessFactorizedNumber fc = new ProcessFactorizedNumber(factorizableNum);
    // Define the AsyncCallback delegate
    AsyncCallback cb = new AsyncCallback(fc.FactorizedResults);
    // Create state object to be passed to the callback in the IAsyncResult object
    Object state = new Object( );
    // Asynchronously invoke the Factorize method on pf
    // in this case, the invocation method (e.g., with callback established), determines
    // the manner in which the end asynchronous method will be invoked
    IAsyncResult ar = fd.BeginInvoke(
    factorizableNum,
    ref temp,
    ref temp,
    cb,
    state);
    //
    // other work
    // . . .
}

// Async Variation 2
// waits for the result, does not employ callback
public void FactorizeNumber2( )
{
    // Client code
    PrimeFactorizer pf = new PrimeFactorizer( );
    FactorizingCallback fd = new FactorizingCallback(pf.Factorize);
    int factorizableNum = 1000589023, temp=0;
    // Asynchronously invoke the Factorize method on pf
    // in this case, with no callback address established, the target method will not
    // invoke a callback upon method completion
    IAsyncResult ar = fd.BeginInvoke(
    factorizableNum,
    ref temp,
    ref temp,
    null,
    null);
    // therefore, the caller WAITS on the result object ar by employing a wait handler
    ar.AsyncWaitHandle.WaitOne(10000, false);
    if (ar.IsCompleted)
    {
    int factor1=0, factor2=0;
    // call the asynchronous end operation method
    fd.EndInvoke(ref factor1, ref factor2, ar); // obtain the result
    Console.WriteLine("Sequential : Factors of {0} : {1} {2}",
        factorizableNum, factor1, factor2); // output the results
    }
}
```

The code samples provided above illustrate two options available to a client for initiating asynchronous operations: supplying a callback delegate when beginning asynchronous operations and not supplying the callback delegate when beginning asynchronous operation. Similarly, options are available to the client for completing asynchronous operations. Four such options are to poll the status object (e.g., IAsyncResult.IsCompleted property) for completion, to attempt to complete the operation prematurely (thereby blocking until the operation completes), to wait on a handle provided by the result object (e.g., IAsyncResult WaitHandle instance) and to complete the operation inside an asynchronous callback routine. The difference between waiting and attempting to complete the operation prematurely is that the client can use timeouts to wake up periodically and determine whether the target method has completed. Although four options for completing asynchronous operations are described, it is to be appreciated that a greater and/or lesser number of options may be employed in accordance with the present invention.

Figure 2:
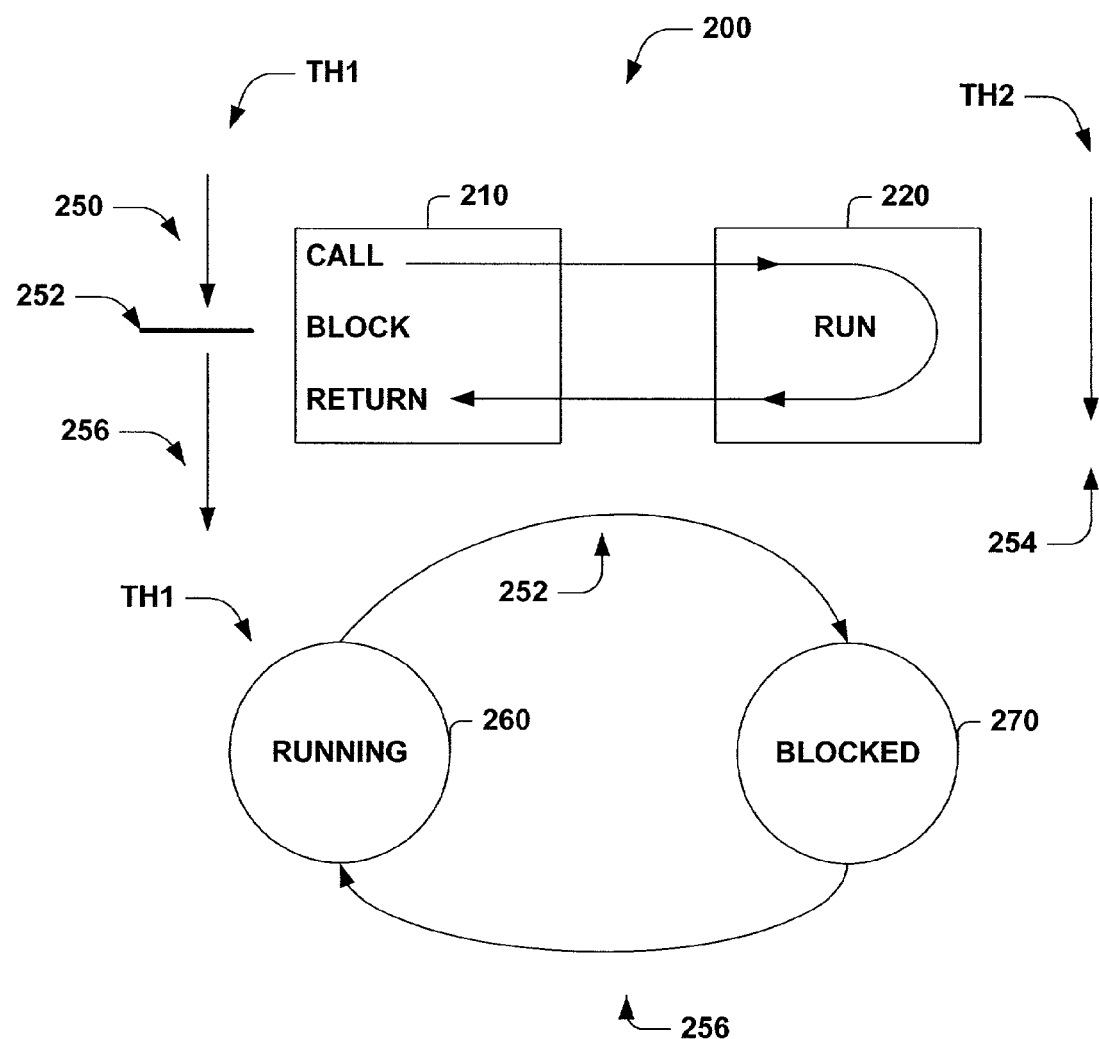
FIG. 2 illustrates state transitions in a conventional synchronous calling system.

Turning now to Prior Art FIG. 2, state transitions produced in a conventional synchronous calling system 200 are illustrated. At 250, a caller 210 that is running in a first thread TH1, makes a synchronous call to a method 220. Before the call 250, the thread TH1 is in a running state 260. At 252, thread TH1 associated with the caller 210 blocks (e.g., moves from running state 260 to blocked state 270) while the method 220 is performed by a different thread (e.g., thread TH2) and runs to completion through 254. At 256, the method 220 returns from the call at 250 and thus thread TH1 unblocks (e.g., moves from blocked state 270 to running state 260). While thread TH1 was blocked, resources (e.g., memory, references) allocated to the thread TH1 were unavailable to other threads, and thus system performance was negatively impacted. It would be advantageous to not have the thread TH1 block, and thus the present invention provides the pattern to facilitate converting synchronous calls to asynchronous calls.

Figure 3:
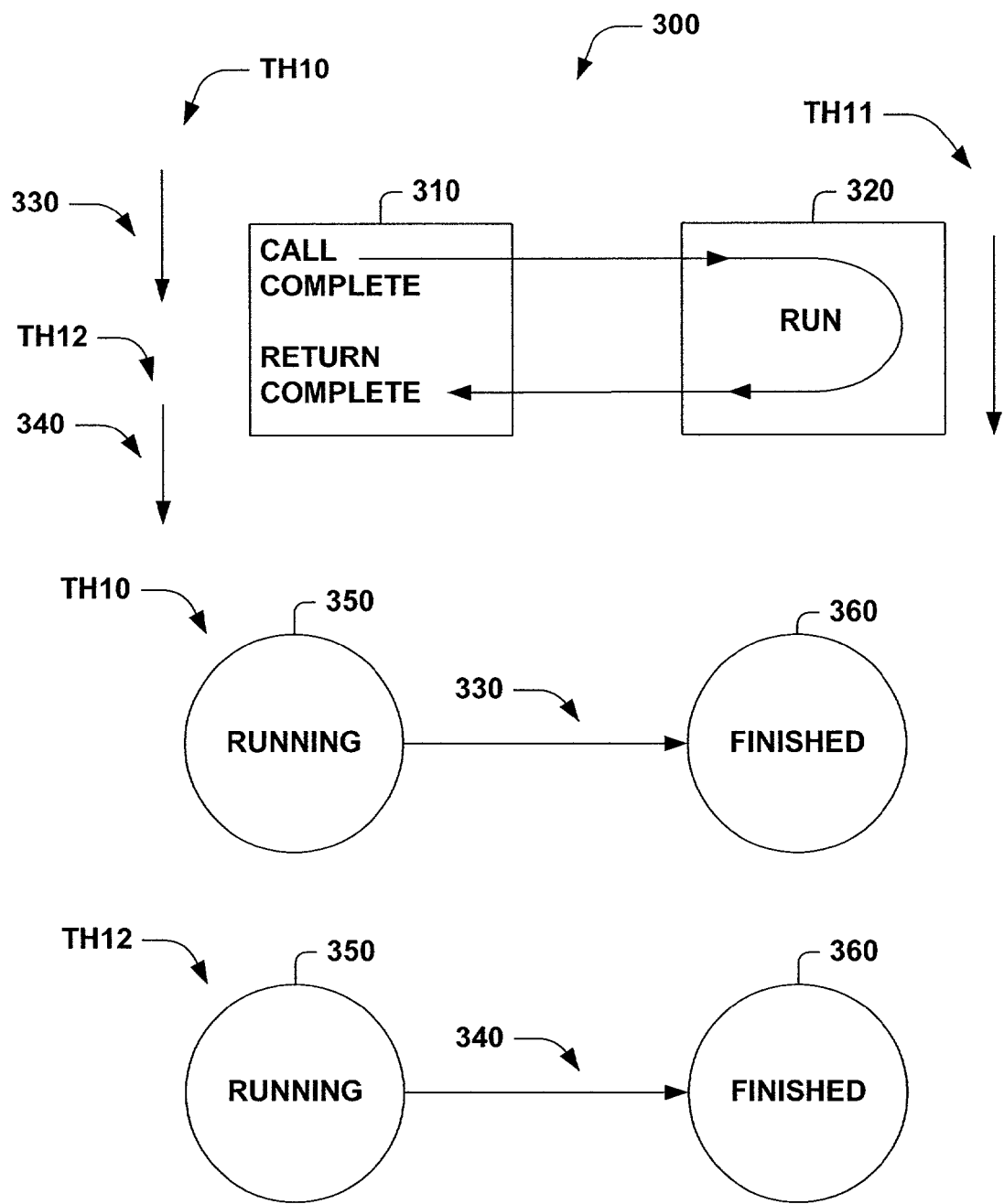
FIG. 3 illustrates state transitions in a system where synchronous calls have been converted to asynchronous calls via a pattern generator, in accordance with an aspect of the present invention.

FIG. 3 illustrates state transitions in a system 300 where a synchronous call has been converted to an asynchronous call via a pattern generator. At 330, a caller 310 that is running in a first thread TH10 makes an asynchronous call to a method 320. Before the call 330, the thread TH10 is in a running state 350. After the call 330, since a goal of a begin asynchronous operation method associated with making the call 330 is to make the call, and not to wait for the completion of the call, the thread TH10 can run to completion without blocking due to asynchronous call processing. Thus, after the call at 330, the thread THIO can move from a running state 350 to a finished state 360. Since the thread TH10 has run to completion, resources associated with the thread TH10 can be reclaimed, and are available for other threads, leading to advantages over conventional, blocking, synchronous systems.

When the method 320, which runs in a second thread TH11 (that may be allocated to the object implementing the method 320) completes, it returns control to the caller 310. In one example of the present invention, at 340, a third thread TH12 then begins running and performs processing associated with ending the asynchronous call. The thread TH12 thus can run to completion without blocking due to asynchronous call processing, and thus can move from a running state 350 to a finished state 360, where resources associated with the thread TH12 can be reclaimed, again providing advantages over conventional systems.

Figure 4:
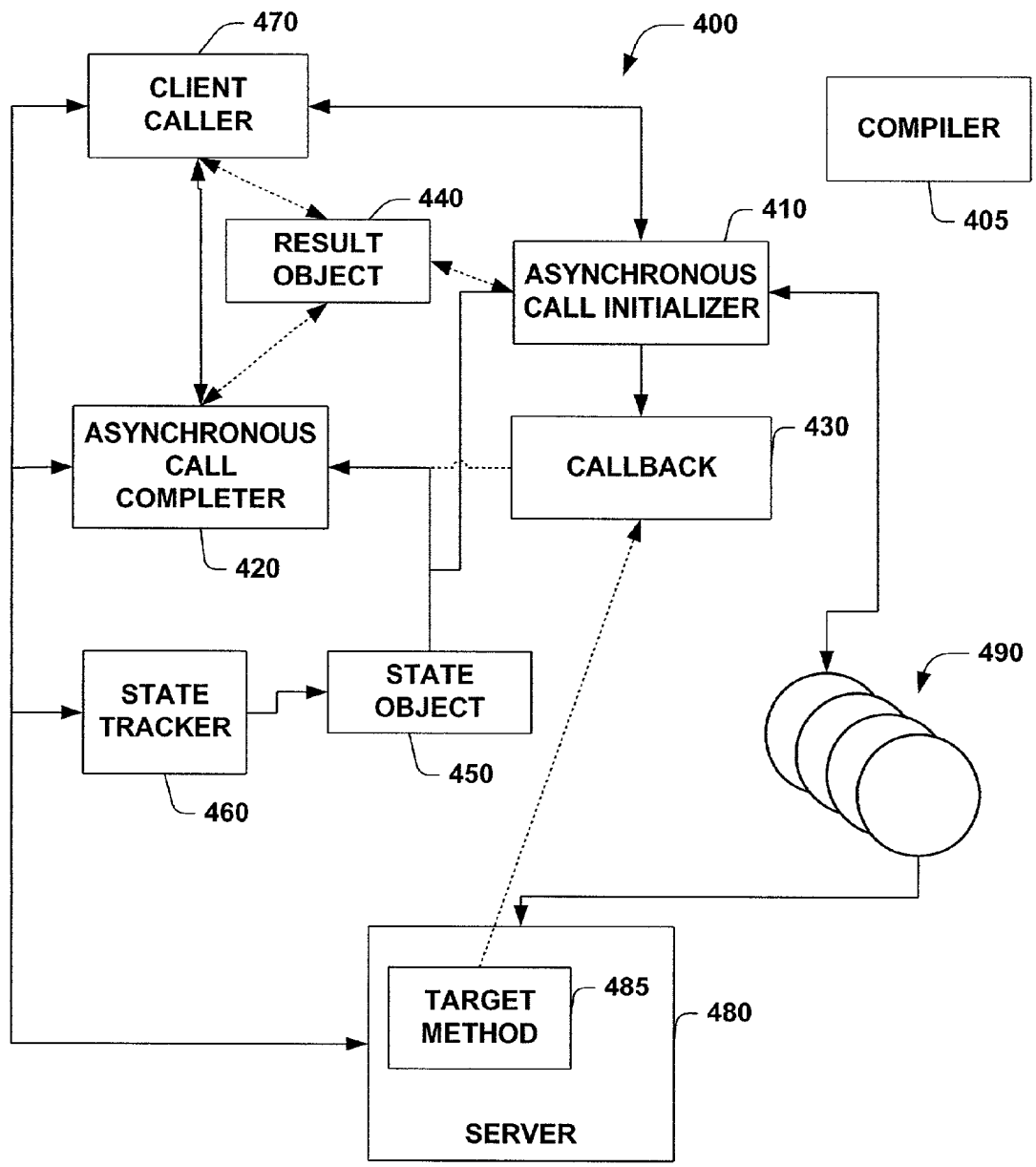
FIG. 4 is a schematic block diagram illustrating a system for providing asynchronous method calls via a common pattern, in accordance with an aspect of the present invention.

FIG. 4 illustrates a system 400 that facilitates asynchronous method calling via a consistent pattern. The system 400 includes an asynchronous call initializer 410, an asynchronous call completer 420, a callback routine 430, a result object 440, a state object 450 and a state tracker 460. The system 400 facilitates a client caller 470 making asynchronous calls to a target method 485 located on a server 480.

The asynchronous call initializer 410 may be, for example, code that begins asynchronous method calling. Such code may be generated, for example, by a compiler 405 that examines synchronous method calling code associated with the client caller 470. The compiler 405 can break the synchronous method call code associated with the client caller 470 into constituent parts and thus produce components including, but not limited to, the asynchronous call initializer 410, the asynchronous call completer 420, the callback routine 430, the result object 440 and the state object 450. The asynchronous call initializer 410 may accept inputs from the client caller 470 and forward them towards the target method 485 via the method call queued in the thread pool 490. Furthermore, the asynchronous call initializer 410 may also initialize the result object 440 and/or the state object 450. The asynchronous call initializer 410 may also establish a callback routine 430 whose address can be passed, for example, via the call queued in the thread pool 490, to the target method 485 and/or the server 480, to facilitate invoking the callback 430 upon completion of the target method 485.

The asynchronous call completer 420 may be, for example, code that completes asynchronous method calling. Such code may be generated, for example, by the compiler 405. The asynchronous call completer 420 can accept results from the target method 485 and pass those results, along with an updated result object, to the client caller 470. Thus, to the client caller 470 it appears as though a synchronous method call was made. Similarly, to the target method 485 it appears as though a synchronous method call was made. Thus, the present invention, by providing the asynchronous call initializer 410, which accepts the inputs from the client caller 470, and by providing the call completer 420, which returns the results expected by the client caller 470, facilitates adding asynchronous method call processing to systems, methods and/or classes that conventionally only have synchronous method call processing available, without requiring the programmer of the client caller 470 or the programmer of the target method 485 to change their code. This provides advantages over conventional asynchronous calling systems that require client caller code and/or target method code to be changed to add asynchronous calling capabilities.

The asynchronous call initializer 410 can receive a request to begin processing associated with making an asynchronous call to the target method 485, initialize the result object 440 and/or state object 450 and then queue a target method call in a thread pool 490. The asynchronous call initializer 410 can then return control and the result object 440 to the client caller 470. In one example of the present invention that does not employ the callback 430, the client caller 470 can then call the asynchronous call completer 420, which can wait for the target method 480 to complete. Alternatively, the client caller 470 can arrange for the asynchronous call completer 420 to be invoked by the callback routine 430 upon completion of the target method 485. The callback routine 430 invokes the asynchronous call completer 420 and true asynchronous behavior is achieved. While the asynchronous call initializer 410, the asynchronous call completer 420, the callback routine 430 and/or the target method 485 are running, the state tracker 460 can be updating the state object 450, so that processes (e.g., the client caller 420 process) can track the state of the call.

Producing an asynchronous call initializer 410, an asynchronous call completer 420, a callback 430, a result object 440 and a state object 450 can be performed, in one example of the present invention, in a compiler 405. Thus, requirements for compilers that implement the present invention include, but are not limited to, emitting delegate classes with Invoke, BeginInvoke and EndInvoke methods using the delegate signature specified by the user. Such delegate classes may hold information that can be employed to call a specific method on a specific object. Thus, conceptually, a delegate can be considered a smart method pointer that facilitates calling a desired method (e.g., a callback method to be called when the target method completes).

For example, referring again to the Factorizing delegate, the following Invoke, BeginInvoke and EndInvoke methods illustrated should be emitted by a compiler 405.

```
class FactorizingCallback: delegate
{
    public bool Invoke(
    int factorizableNum,
    ref int primefactor1,
    ref int primefactor2);
    // asynchronous call initializer
    public IAsyncResult BeginInvoke(
    int factorizableNum,
    ref int primefactor1,
    ref int primefactor2,
    AsyncCallback cb,
    Object AsyncState
    );
    // asynchronous call completer
    public bool EndInvoke(
    ref int primefactor1,
    ref int primefactor2,
    IAsyncResult ar);
}
```

In one example of the present invention, a compiler that has been configured to interact with the present invention will produce the BeginInvoke method so that it includes the IN parameters intended for the target method 485, includes the IN/OUT parameters intended for the target method 485, includes by reference parameters intended for the target method 485, takes an asynchronous callback routine (e.g. AsyncCallback) and an asynchronous call state object (e.g., AsyncState) as last two parameters of the method and returns an asynchronous result object (e.g., IAsyncResult). Similarly, the compiler 405 should produce the EndInvoke method so that it includes IN/OUT parameters intended for the target method 485, includes OUT parameters intended for the target method 485, includes pass by reference parameters intended for the target method 485, takes an asynchronous result object (e.g., IAsyncResult) as last parameter and returns the original return type from the original method signature.

The following code illustrates example classes that implement the asynchronous call method pattern in accordance with an aspect of the present invention. While the code provides one specific example of the pattern as applied, the code is merely illustrative of two example asynchronous call implementations of the present invention and it is to be appreciated that other asynchronous call implementations, in other computer languages may be employed in accordance with the present invention.

```
// Asynchronous Sample
using System;
using System.Threading;
using System.Runtime.Remoting;
// Async delegate
public delegate bool FactorizingCallback(int factorizableNum,
    ref int primefactor1,
    ref int primefactor2);
// Class that factorizes the number
public class PrimeFactorizer
{
    public bool Factorize(
    int factorizableNum,
    ref int primefactor1,
    ref int primefactor2)
    {
    primefactor1 = 1;
    primefactor2 = factorizableNum;
    // Factorize using a low tech approach
    for (int i=2;i<factorizableNum;i++)
    {
       (0 == (factorizableNum % i))
       {
          primefactor1 = i;
          primefactor2 = factorizableNum/i;
          break;
       }
    }
    if (1 == primefactor1)
       return false;
    else
       return true;
    }
}
// Class that receives a callback when results are available
public class ProcessFactorizedNumber
{
    private int_ulNumber;
    public ProcessFactorizedNumber(int number)
    {
    _ulNumber = number;
    }
    public void FactorizedResults(IAsyncResult ar)
    {
    int factor1=0, factor2=0;
    // Extract the delegate from the AsyncResult
    FactorizingCallback fd = (FactorizingCallback)((AsyncResult)ar).AsyncDelegate;
    // Obtain the result
    // call the asynchronous call completer 420
    fd.EndInvoke(ref factor1, ref factor2, ar);
    // Output results
    Console.WriteLine("On CallBack: Factors of {0} : {1} {2}",
       _ulNumber, factor1, factor2);
    }
}
// Class that shows variations of using async
public class Simple
{
    // Async Variation 1
    // The ProcessFactorizedNumber.FactorizedResults callback
    // is called when the call completes.
    public void FactorizeNumber1( )
    {
    // Client code
    PrimeFactorizer pf = new PrimeFactorizer( ); // get instance
    FactorizingCallback fd = new FactorizingCallback
       (pf.Factorize); // callback
    int factorizableNum = 1000589023, temp=0;
    // Create an instance of the class that is going to be called
       when the call completes
    ProcessFactorizedNumber fc = new ProcessFactorizedNumber(factorizableNum);
    // Define the AsyncCallback delegate
    AsyncCallback cb = new AsyncCallback(fc.FactorizedResults);
    // create state object
    Object state =new Object( );
    // Asynchronously invoke the Factorize method on pf
    // calling the asynchronous call initializer 410 with the
       callback address established
    // controls the target method to invoke the callback routine
       when it is done processing
    IAsyncResult ar = fd.BeginInvoke(
       factorizableNum,
       ref temp,
       ref temp,
       cb,
       state);
    //
    // Other work
    // . . .
    // Here, the thread runs to completion, with no blocking due to
    // asynchronous call processing
    }
    // Async Variation 2
    // Waits for the result, does not employ callback
    public void FactorizeNumber2( )
    {
    // Client code
    PrimeFactorizer pf = new PrimeFactorizer( );
    int factorizableNum = 1000589023, temp=0;
    // Create an instance of the class that is going to be called
       when the call completes
```

```
ProcessFactorizedNumber fc = new ProcessFactorized-
    Number(factorizableNum);
// Asynchronously invoke the Factorize method on pf
// do not employ callback when calling the asynchronous
    call initializer 410
IAsyncResult ar = fd.BeginInvoke(
    factorizableNum,
    ref temp,
    ref temp,
    null,
    null);
// since no callback was employed, the asynchronous call
    initializer now
// will wait on a handle provided by the result object to
    determine when
// target method processing
// has completed, other methods illustrated below may
    include polling and
// prematurely attempting to complete the call
ar.AsyncWaitHandle.WaitOne(10000, false);
if (ar.IsCompleted)
{
    int factor1=0, factor2=0;
    // Obtain the result by calling the asynchronous call
        completer 420
    fd.EndInvoke(ref factor1, ref factor2, ar);
    Output results returned form the asynchronous call
        completer 420
    Console.WriteLine("Sequencial : Factors of {0} : {1}
        {2}",
        factorizableNum, factor1, factor2);
}
}
// program entry point MAIN
    public static void Main(String[ ] args)
{
Simple simple = new Simple( );
simple.FactorizeNumber1( ); // make an asynchronous
    call using callback
    // completion technique
simple.FactorizeNumber2( ); // make an asynchronous
    call using waitable object
    // completion technique
}
}
```

The sample code above illustrates two asynchronous calls made where changes to the calling client calling technique and/or the target method implementation code were not required, which illustrates ease of implementation advantages over conventional systems.

Figure 5:
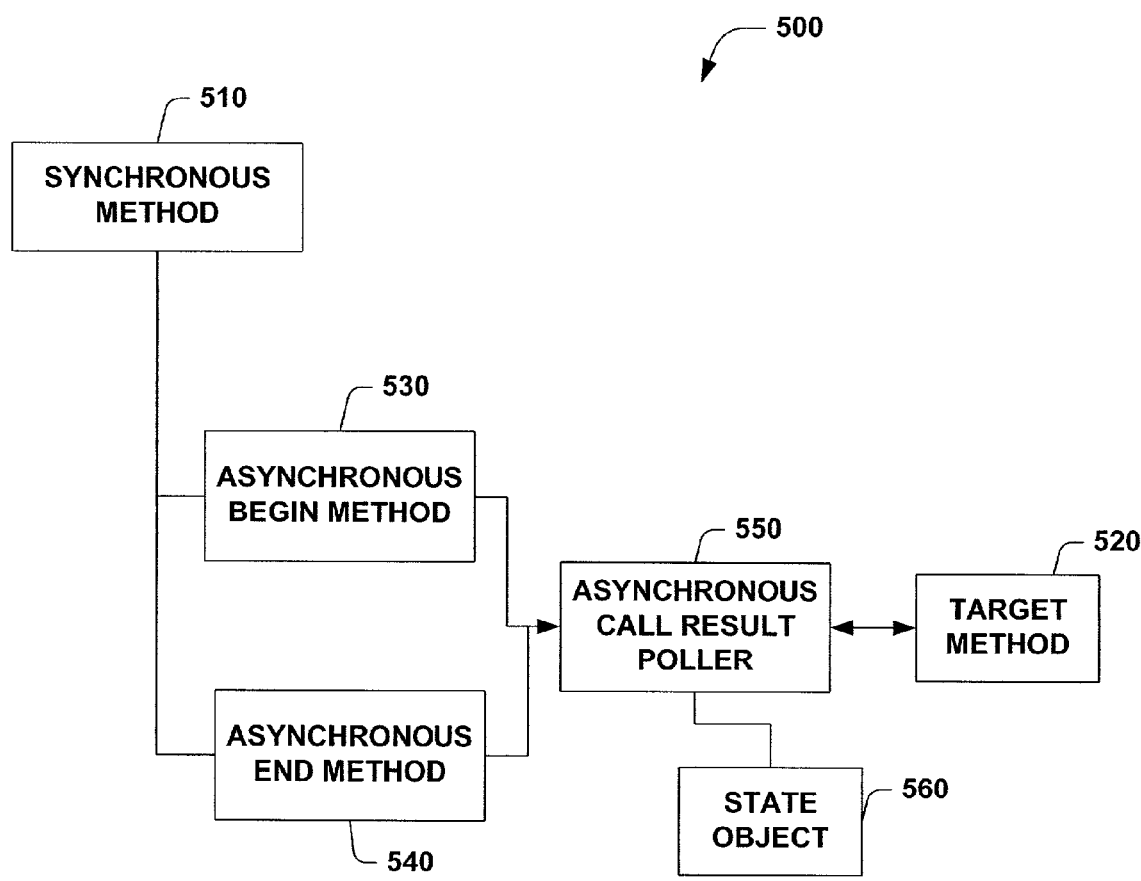
FIG. 5 is a schematic block diagram illustrating a system for providing asynchronous method calls via a common pattern and a call result poller, in accordance with an aspect of the present invention.
Figure 6:
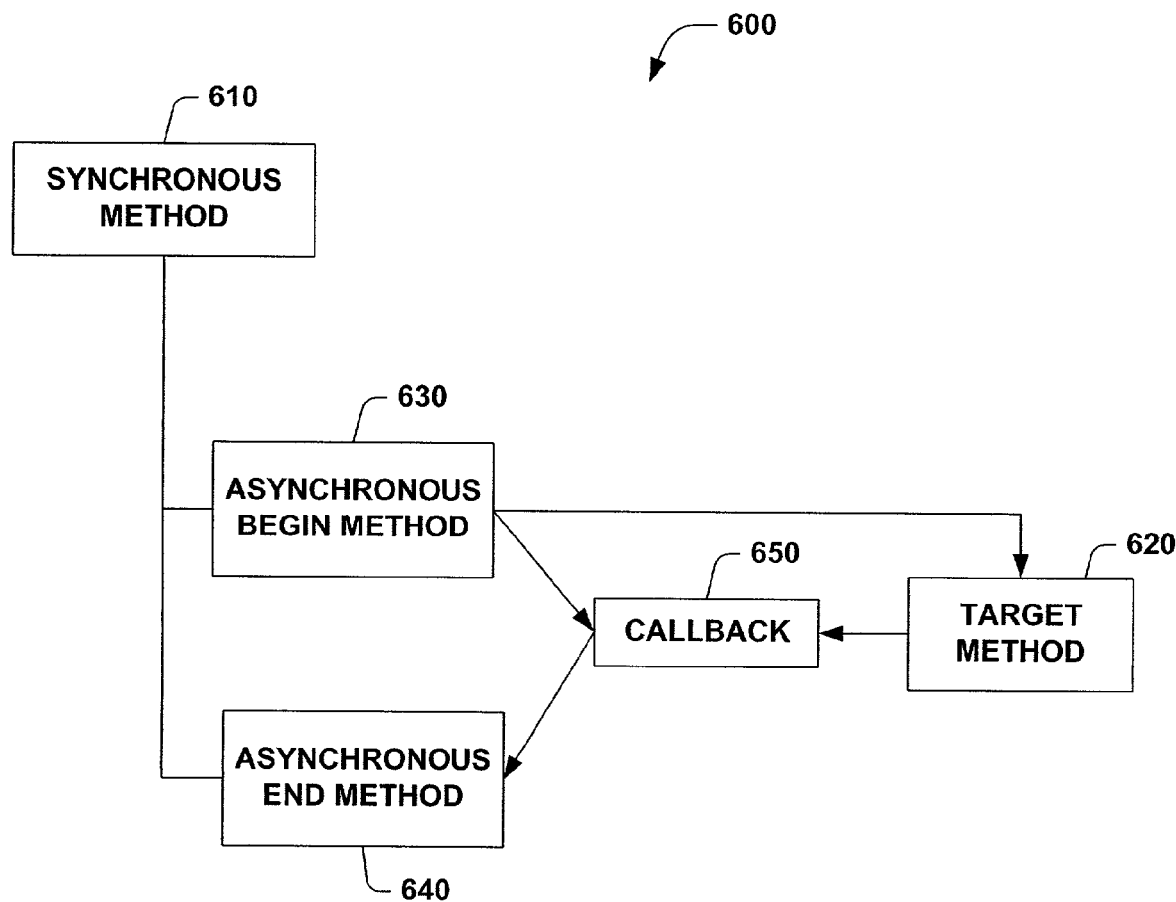
FIG. 6 is a schematic block diagram illustrating a system for providing asynchronous method calls via a common pattern and a callback routine, in accordance with an aspect of the present invention.
Figure 7:
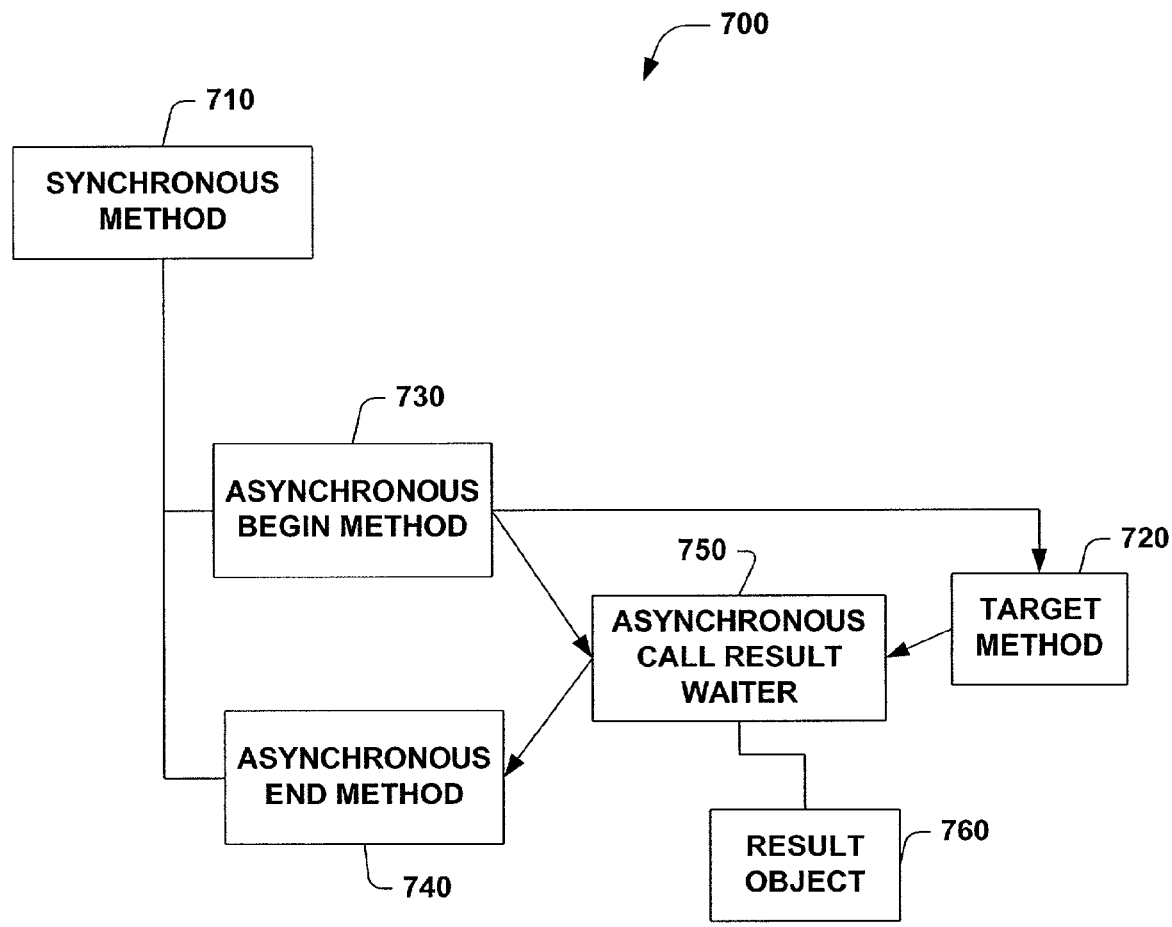
FIG. 7 is a schematic block diagram illustrating a system for providing asynchronous method calls via a common pattern and a wait handler, in accordance with an aspect of the present invention.

FIGS. 5 through 7 illustrate three different systems that employ three different methods to control when end asynchronous processing methods are invoked. While three such methods are illustrated, it is to be appreciated that a greater and/or lesser number of methods can be employed by systems and/or methods implementing the present invention. Thus, turning to FIG. 5, a system 500 for providing asynchronous method calls via a common pattern is illustrated. A synchronous method call 510 intended for a target method 520 is broken into constituent parts including an asynchronous begin method 530, an asynchronous end method 540 and a state object 560. The target method 520 may perform, for example, lengthy database lookups, and thus the client calling the target method 520 may benefit from having the target method 520 called asynchronously. In FIG. 5, an asynchronous call result poller 550 is employed to poll the state object 560 to determine when the target method 520 has completed. Thus, rather than the client calling the target method 520 blocking, polling (alone and/or in combination with voluntary relinquishing of control and/or resources) may be employed to improve system performance. Furthermore, by identifying a point in time when resources associated with the target method 520 results are required, where such point in time can be monitored via the state object 560, acquiring such resources can be delayed until after that point in time, providing improvements in system performance. For example, if processing results generated by the target method requires a large amount of memory and multiple processors, then acquiring such resources can be performed in a just in time fashion, rather than pre-acquiring such resources and blocking while waiting for the target method to complete. When the asynchronous call result poller 550 determines that the target method 520 has completed, the asynchronous call result poller 550 can invoke the asynchronous end method 540.

Turning now to FIG. 6, a system 600 for providing asynchronous method calls via a common pattern is illustrated. A synchronous method call 610 intended for a target method 620 is broken into constituent parts including an asynchronous begin method 630 and an asynchronous end method 640. The target method 620 may perform, for example, lengthy numerical calculations, and thus the client calling the target method 620 may benefit from having the target method 620 called asynchronously. In FIG. 6, an asynchronous callback routine 650 is employed to control when asynchronous end processing will be performed. When the target method 620 completes, the callback routine 650 will be invoked, for example, by a runtime that receives a notification of the target method 620 completing. Thus, rather than blocking the client calling the target method 620, the asynchronous begin method 630 can run to completion, and thus release its resources, leading to improvements in system performance. When the callback routine 650 is invoked, a separate thread may be employed to run the asynchronous end method 640, again providing improvements in resource utilization.

Turning to FIG. 7, a system 700 for providing asynchronous method calls via a common pattern is illustrated. A synchronous method call 710 intended for a target method 720 is broken into constituent parts including an asynchronous begin method 730, an asynchronous end method 740 and a result object 760. The target method 720 may perform, for example, numerous web image acquisitions, and thus the client calling the target method 720 may benefit from having the target method 720 called asynchronously. In FIG. 7, an asynchronous call result waiter 750 (e.g., a WaitHandle class object) is employed to wait on the result object 760 to determine when the target method 720 has completed. Thus, rather than blocking the client calling the target method 720, wait processing, alone and/or in combination with voluntary relinquishing of control and/or resources may be employed to improve system performance. When the asynchronous call result waiter 750 determines that the target method 720 has completed, the asynchronous call result waiter 750 can invoke the asynchronous end method 740.

One example asynchronous call result waiter 750 can be associated with an object of the WaitHandle class, which represents synchronous objects that allow multiple waits in a runtime. The WaitHandle class may have public shared methods that include, but are not limited to, a WaitAll method that facilitates waiting on a set of items, where all members of the set are required to satisfy the wait condition, a WaitAny method that facilitates waiting on a set of items, where any one of the set can satisfy the wait condition, and a WaitOne method that facilitates waiting on one item. Thus, in the web image example, the asynchronous begin method 730 may queue a plurality of image retrieval calls to the target method 720 and then wait on one particular image retrieval call to return, wait on any of a set of image retrieval calls to return and/or wait on an entire set of image retrieval calls to return, before invoking the asynchronous end method 740.

FIGS. 5 through 7 illustrate various methods for controlling when asynchronous end methods could be invoked, which provides flexibility and customizability advantages over conventional asynchronous calling systems that may not provide such flexible asynchronous end method processing.

In view of the exemplary systems shown and described above, methodologies that may be implemented in accordance with the present invention will be better appreciated with reference to the flow charts of FIGS. 8 through 12. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments. Furthermore, computer executable instructions operable to perform the methods described herein may be stored on computer readable media.

Figure 8:
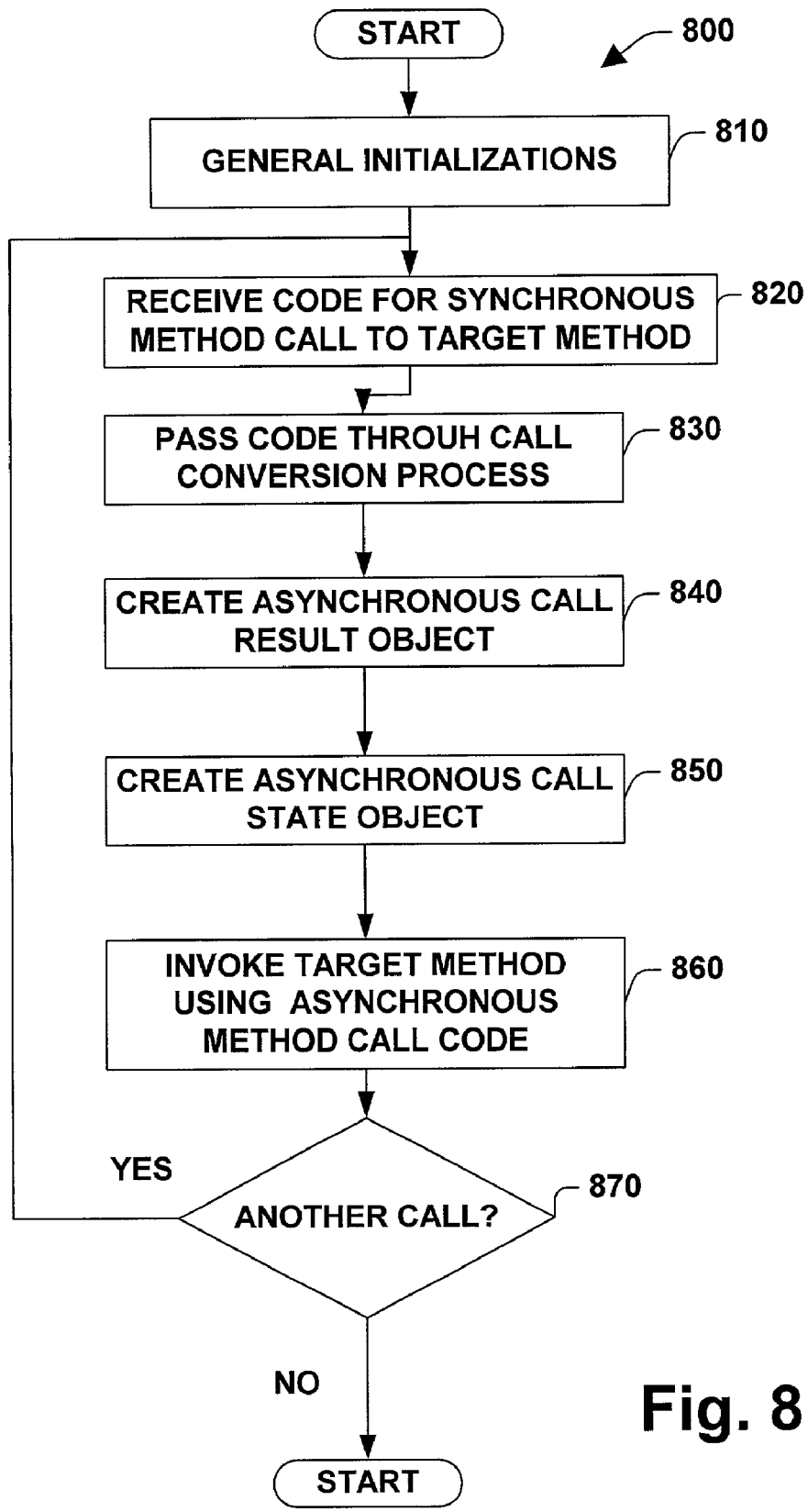
FIG. 8 is a flow chart illustrating a method for creating an asynchronous method call, in accordance with an aspect of the present invention.

FIG. 8 is a flow chart illustrating a method 800 for creating an asynchronous method call, in accordance with an aspect of the present invention. At 810, general initializations occur. Such initializations include, but are not limited to, allocating memory, establishing pointers, establishing data communications, acquiring resources, instantiating objects, and setting initial values for variables. At 820, code for a synchronous call on a target method is received. At 830, the code of 820 passes through a call conversion process, which can include breaking the code for the synchronous method call into constituent parts and creating one or more asynchronous method call code segments corresponding to the constituent parts. The constituent parts can include, but are not limited to a begin operation that will not block due to asynchronous method calling and an end operation that similarly will not block due to asynchronous method calling.

At 840, a result object is created. The asynchronous result object can be employed to hold results associated with the target method and/or results associated with the asynchronous call processing, for example. At 850, an asynchronous call state object is created. The asynchronous call state object can be employed to facilitate tracking and logging state associated with the begin operation, the end operation and the target method, for example. At 860, the target method is invoked using the asynchronous method call code. Such invocation may be achieved by queuing a call to the target method in a thread pool, for example. At 870, a determination is made concerning whether there is another synchronous method call on a target method to convert. If the determination at 870 is YES, then processing returns to 820, otherwise processing can conclude.

Figure 9:
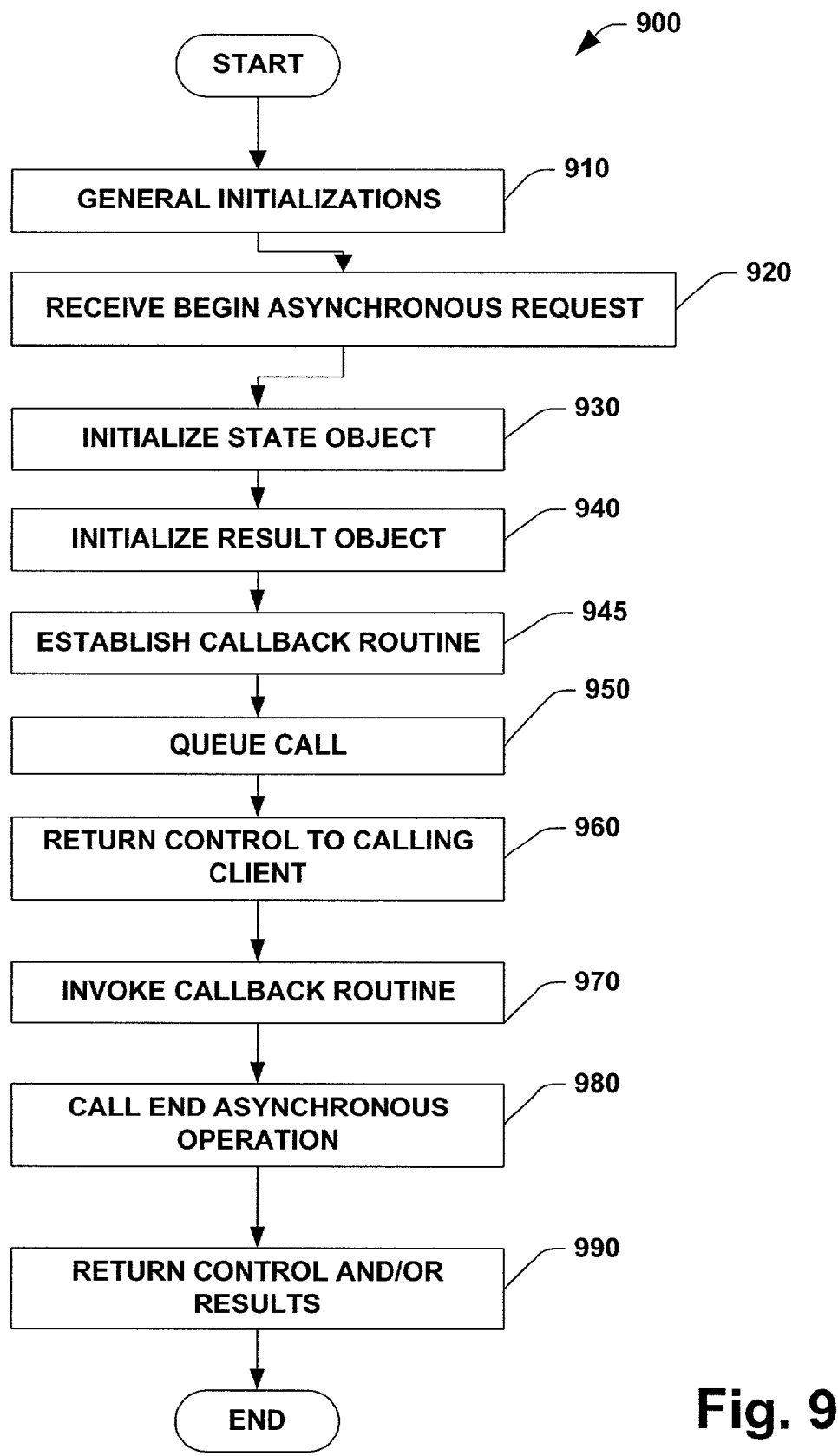
FIG. 9 is a flowchart illustrating a method for making an asynchronous method call that employs a callback routine in accordance with an aspect of the present invention.

FIG. 9 illustrates a method 900 that facilitates making asynchronous method calls via a consistent pattern that employs a callback routine. At 910, general initializations occur. Such initializations can include, but are not limited to, memory allocations, field initializations, object initializations, thread acquisition and establishing data communications, for example.

At 920, a request from a calling client to perform processing associated with beginning an asynchronous call to a target method is received. At 930, a state tracking object is initialized. The state tracking object can be employed to facilitate tracking and logging state associated with beginning asynchronous operations, ending asynchronous operations and the target method processing, for example. At 940, a result object is initialized. The result object can be employed to hold results associated with the target method and/or results associated with the asynchronous call processing, for example. At 945, a callback routine is established. The callback routine can be employed to receive notification of the completion of the target method and to invoke processing associated with ending the asynchronous call to the target method. At 950, a call to the target method is queued. For example, the call may be queued in a thread pool. At 960, control and the result object are returned to the calling client, which can employ the result object to determine the completion status of a begin asynchronous operation method, for example. Since control is returned at 960, a first thread employed to perform the begin asynchronous call processing of 910 through 960 can complete, freeing resources associated with the thread resulting in reductions in system resource requirements over conventional single threaded systems.

At 970, the callback routine is invoked upon receiving notification of the completion of the target method. The callback routine may be invoked, for example, by a runtime that monitors the completion status of the target method. At 980, the callback routine calls a method to perform processing associated with ending the asynchronous call. Such processing may be performed in a thread separate from a thread that was employed to perform processing associated with beginning the asynchronous call, and thus both threads may be made more computationally and/or memory efficient, providing advantages over methods where one thread employed to perform both begin and end processing would have blocked. At 990, control is passed to the calling client upon completion of the processing associated with ending the asynchronous call to the target method.

Figure 10:
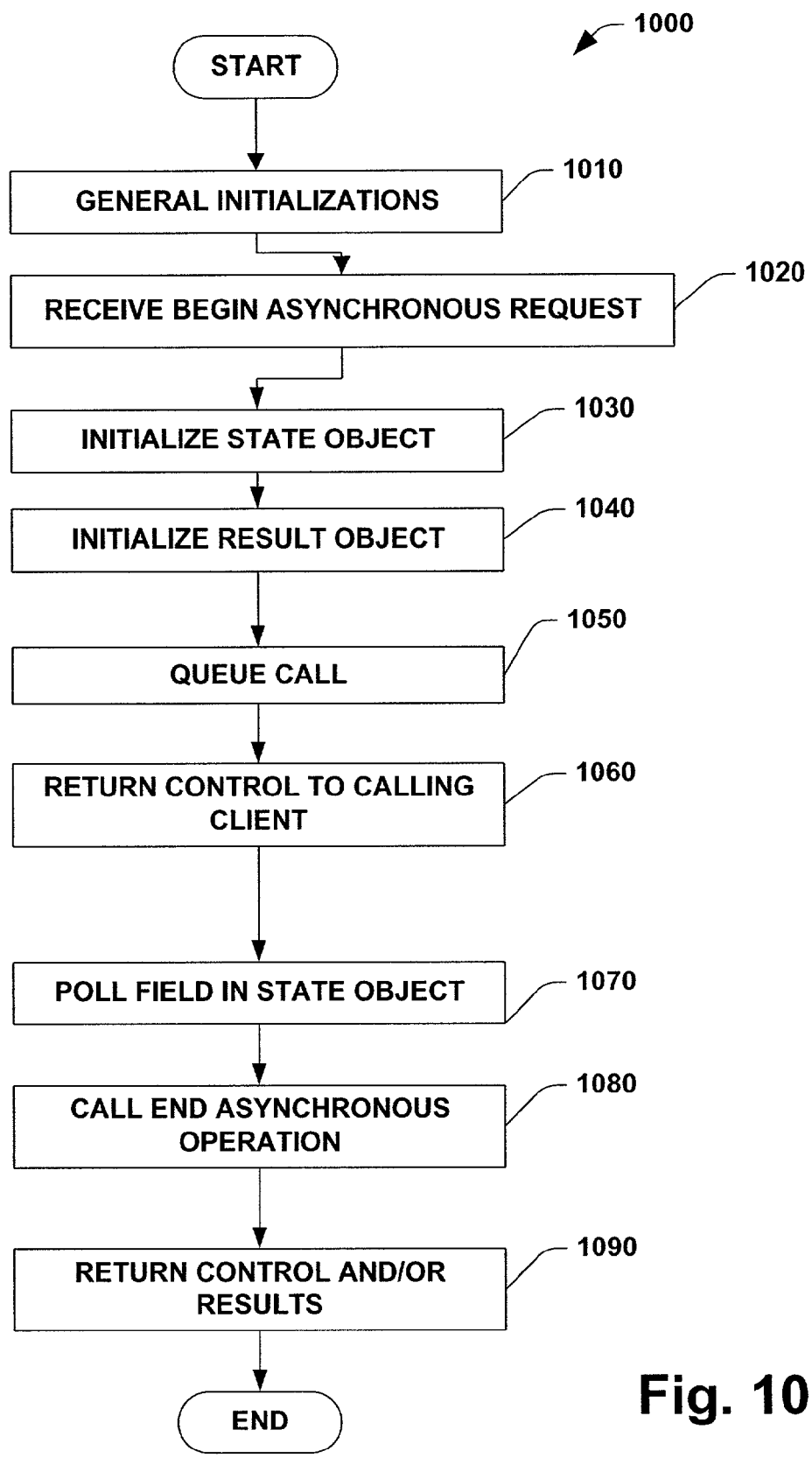
FIG. 10 is a flowchart illustrating a method for making an asynchronous method call that employs a polling completion technique in accordance with an aspect of the present invention.

FIG. 10 illustrates a method 1000 that facilitates making asynchronous method calls via a consistent pattern and a polling technique. At 1010, general initializations occur. Such initializations can include, but are not limited to, memory allocations, field initializations, object initializations, thread acquisition and establishing data communications, for example.

At 1020, a request from a calling client to perform processing associated with beginning an asynchronous call to a target method is received. At 1030, a state tracking object is initialized. The state tracking object can be employed to facilitate tracking and logging state associated with beginning asynchronous operations, ending asynchronous operations and the target method processing, for example. At 1040, a result object is initialized. The result object can be employed to hold results associated with the target method and/or results associated with the asynchronous call processing, for example. At 1050, a call to the target method is queued. For example, the call may be queued in a thread pool. At 1060, control and the result object are returned to the calling client, which can employ the result object to determine the completion status of a begin asynchronous operation method, for example.

At 1070 the method 1000 begins polling a field in the state object of 1030. The polled field may contain, for example, information concerning whether the target method has completed. When the polling indicates that the target method has completed, and/or that polling has proceeded beyond a pre-determined amount of time, at 1080 the method 11000 calls a method to perform processing associated with ending the asynchronous call. At 1090, control is passed to the calling client upon completion of the processing associated with ending the asynchronous call to the target method. Thus, FIG. 10 illustrates a polling method, as compared to the callback method of FIG. 9, to determine when end asynchronous operations should be performed, providing flexibility advantages over conventional systems.

Figure 11:
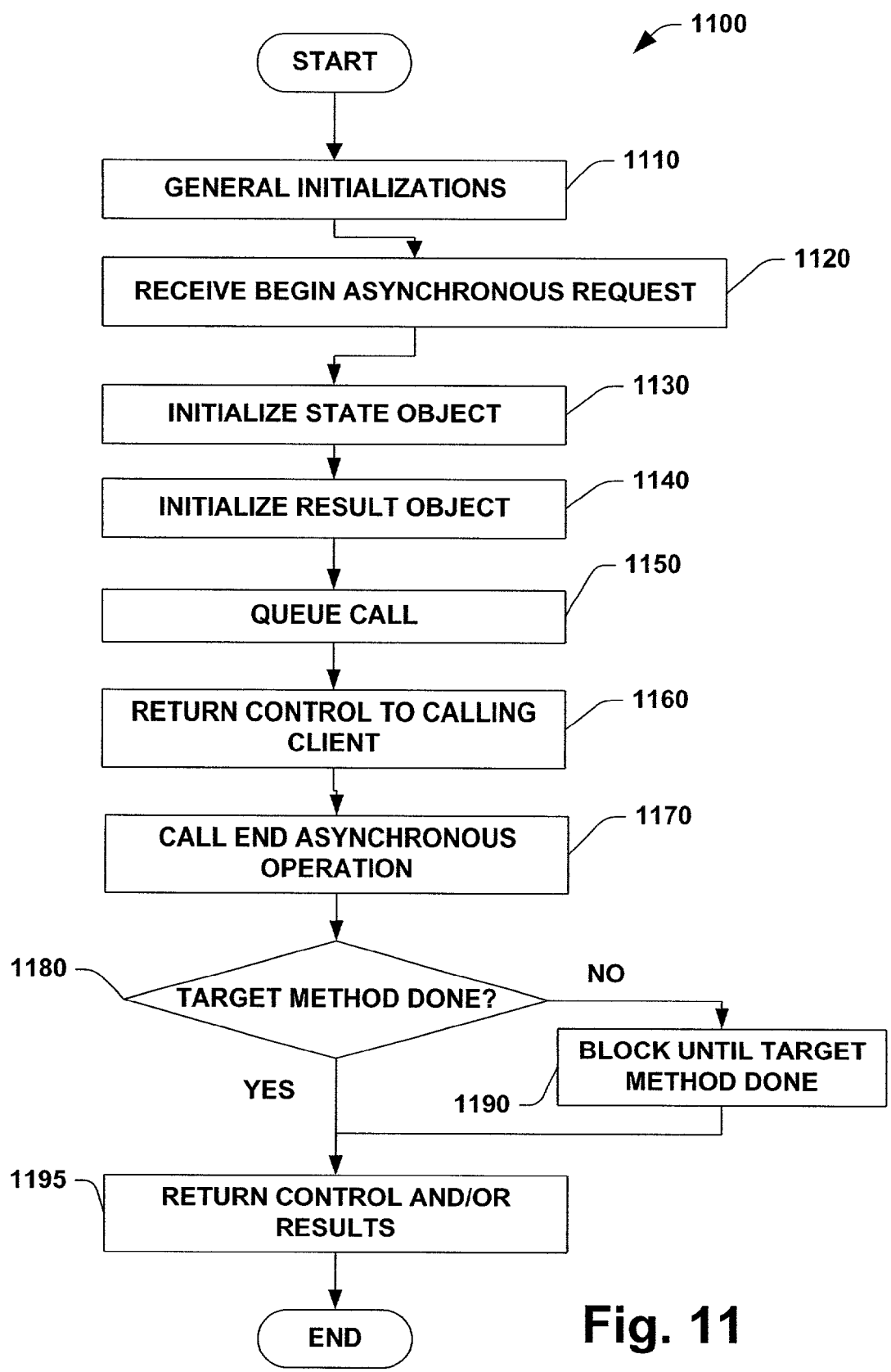
FIG. 11 is a flowchart illustrating a method for making an asynchronous method call that employs a blocking technique in accordance with an aspect of the present invention.

FIG. 11 illustrates a method 1100 that facilitates making asynchronous method calls via a consistent pattern and a blocking technique. At 1110, general initializations occur. Such initializations can include, but are not limited to, memory allocations, field initializations, object initializations, thread acquisition and establishing data communications, for example.

At 1120, a request from a calling client to perform processing associated with beginning an asynchronous call to a target method is received. At 1130, a state tracking object is initialized. The state tracking object can be employed to facilitate tracking and logging state associated with beginning asynchronous operations, ending asynchronous operations and the target method processing, for example. At 1140, a result object is initialized. The result object can be employed to hold results associated with the target method and/or results associated with the asynchronous call processing, for example. At 1150, a call to the target method is queued. For example, the call may be queued in a thread pool. At 1160, control and the result object are returned to the calling client.

At 1170, the entity to which control and the result object were returned at 1160 may attempt to complete the asynchronous operation explicitly by calling a method to perform processing associated with ending the asynchronous call. Such a call may block, providing less than asynchronous behavior, if the target method has not completed by the time the call at 1170 is processed. Thus, at 1180, the method 1100 determines whether the target method has completed. If the determination at 1180 is NO, that the target method has not completed, then at 1190, the method 1100 will block until the target method has completed. If the determination at 1180 was YES, and/or after the target method has completed and the block of 1190 has been lifted, at 1195, control and/or results will be passed to the calling entity.

Thus, FIG. 11 illustrates a simple blocking method, whereas FIG. 10 illustrates a polling method and FIG. 9 illustrates a callback method employed to determine when end asynchronous operations should be performed, providing further flexibility advantages over conventional systems.

Figure 12:
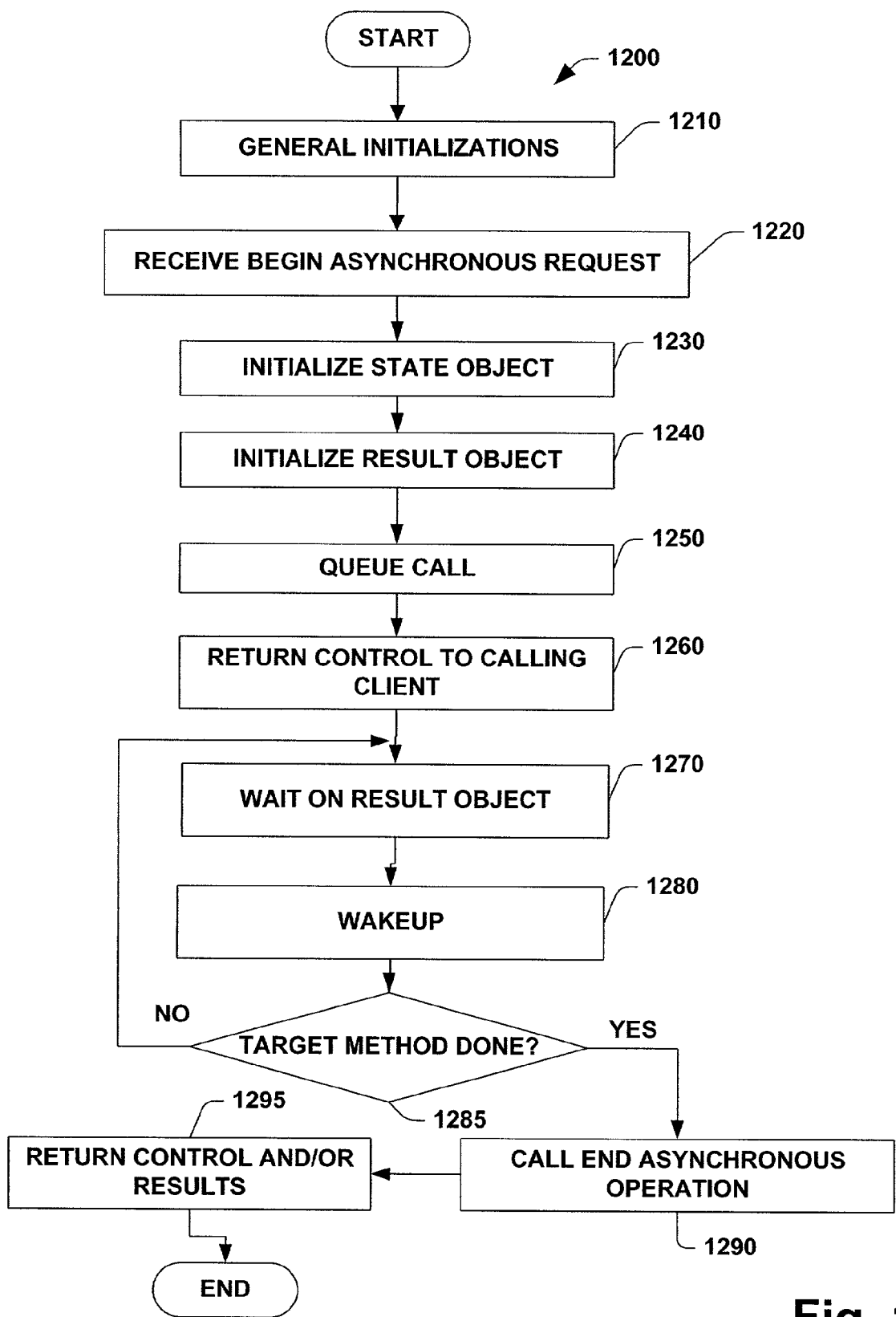
FIG. 12 is a flowchart illustrating a method for making an asynchronous method call that employs a waitable object in accordance with an aspect of the present invention.

FIG. 12 illustrates a method 1200 that facilitates making asynchronous method calls via a consistent pattern and a waiting technique. At 1210, general initializations occur. Such initializations can include, but are not limited to, memory allocations, field initializations, object initializations, thread acquisition and establishing data communications, for example.

At 1220, a request from a calling client to perform processing associated with beginning an asynchronous call to a target method is received. At 1230, a state tracking object is initialized. The state tracking object can be employed to facilitate tracking and logging state associated with beginning asynchronous operations, ending asynchronous operations and the target method processing, for example. At 1240, a result object is initialized. The result object can be employed to hold results associated with the target method and/or results associated with the asynchronous call processing, for example. At 1250, a call to the target method is queued. For example, the call may be queued in a thread pool. At 1260, control and the result object are returned to the calling client, which can wait on the result object to determine the completion status of the target method and to control when to call an end asynchronous method, for example.

At 1270, the method 1200 voluntarily relinquishes control and/or resources and goes to sleep. After a pre-determined period of time, and/or upon receiving a signal associated with the entity upon which the method 1200 is waiting, at 1280, the method 1200 wakes up and at 1285 makes a determination concerning whether the target method has completed. By way of illustration and not limitation, the method 1200 may query a field in the state object of 1230 to determine whether the target method has completed. If the determination at 1285 is NO, that the target method has not completed its processing, then the method 1200 returns to 1270 where it will repeat the waiting sequence. But if the determination at 1285 is YES, that the target method has completed, then at 1290, a call to end the asynchronous operation will be made and at 1295 control and/or results from the target method can be returned to the calling entity.

Thus, FIG. 12 illustrates a waiting method, whereas FIG. 11 illustrates a simple blocking method, FIG. 10 illustrates a polling method and FIG. 9 illustrates a callback method employed to determine when end asynchronous operations should be performed, providing even further flexibility advantages over conventional systems.

Figure 13:
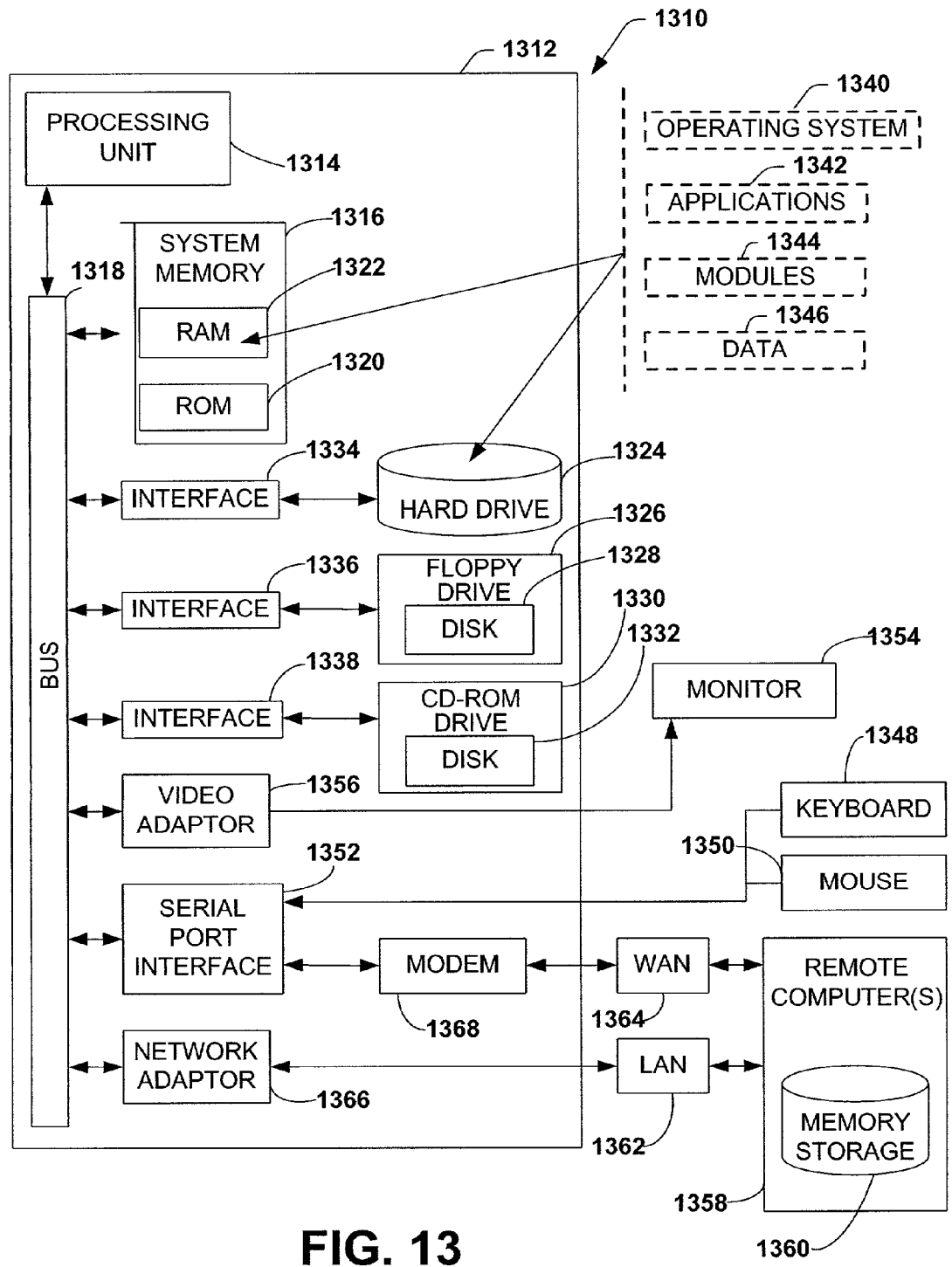
FIG. 13 is a schematic block diagram of an exemplary operating environment for a system configured in accordance with the present invention.

In order to provide additional context for various aspects of the present invention, FIG. 13 and the following discussion are intended to provide a brief, general description of one possible suitable computing environment 1310 in which the various aspects of the present invention may be implemented. It is to be appreciated that the computing environment 1310 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software. Generally, program modules include routines, programs, components, data structures, etc. that perform particular tasks or implement particular abstract data types. Moreover, one will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices. Additionally, the illustrated aspects can be reproduced in a variety of computer languages and runtime environments.

FIG. 13 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 13, an exemplary environment 1310 for implementing various aspects of the invention includes a computer 1312, including a processing unit 1314, a system memory 1316, and a system bus 1318 that couples various system components including the system memory to the processing unit 1314. The processing unit 1314 may be any of various commercially available processors. Dual microprocessors and other multi-processor architectures also can be used as the processing unit 1314.

The system bus 1318 may be any of several types of bus structure including a memory bus or memory controller, a peripheral bus, and a local bus using any of a variety of commercially available bus architectures. The computer memory 1316 includes read only memory (ROM) 1320 and random access memory (RAM) 1322. A basic input/output system (BIOS), containing the basic routines that help to transfer information between elements within the computer 1312, such as during start-up, is stored in ROM 1320.

The computer 1312 may further include a hard disk drive 1324, a magnetic disk drive 1326, e.g., to read from or write to a removable disk 1328, and an optical disk drive 1330, e.g., for reading a CD-ROM disk 1332 or to read from or write to other optical media. The hard disk drive 1324, magnetic disk drive 1326, and optical disk drive 1330 are connected to the system bus 1318 by a hard disk drive interface 1334, a magnetic disk drive interface 1336, and an optical drive interface 1338, respectively. The computer 1312 typically includes at least some form of computer readable media. Computer readable media can be any available media that can be accessed by the computer 1312. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1312.

A number of program modules may be stored in the drives and RAM 1322, including an operating system 1340, one or more application programs 1342, other program modules 1344, and program non-interrupt data 1346. The operating system 1340 in the computer 1312 can be any of a number of commercially available operating systems.

A user may enter commands and information into the computer 1312 through a keyboard 1348 and a pointing device, such as a mouse 1350. Other input devices (not shown) may include a microphone, an IR remote control, a joystick, a game pad, a satellite dish, a scanner, or the like. These and other input devices are often connected to the processing unit 1314 through a serial port interface 1352 that is coupled to the system bus 1318, but may be connected by other interfaces, such as a parallel port, a game port, a universal serial bus ("USB"), an IR interface, etc. A monitor 1354, or other type of display device, is also connected to the system bus 1318 via an interface, such as a video adapter 1356. In addition to the monitor, a computer typically includes other peripheral output devices (not shown), such as speakers, printers etc.

The computer 1312 may operate in a networked environment using logical and/or physical connections to one or more remote computers, such as a remote computer(s) 1358. The remote computer(s) 1358 may be a workstation, a server computer, a router, a personal computer, microprocessor based entertainment appliance, a peer device or other common network node, and typically includes many or all of the elements described relative to the computer 1312, although, for purposes of brevity, only a memory storage device 1360 is illustrated. The logical connections depicted include a local area network (LAN) 1362 and a wide area network (WAN) 1364. Such networking environments are commonplace in offices, enterprise-wide computer networks, intranets and the Internet.

When used in a LAN networking environment, the computer 1312 is connected to the local network 1362 through a network interface or adapter 1366. When used in a WAN networking environment, the computer 1312 typically includes a modem 1368, or is connected to a communications server on the LAN, or has other means for establishing communications over the WAN 1364, such as the Internet. The modem 1368, which may be internal or external, is connected to the system bus 1318 via the serial port interface 1352. In a networked environment, program modules depicted relative to the computer 1312, or portions thereof, may be stored in the remote memory storage device 1360. It will be appreciated that the network connections shown are exemplary and other means of establishing a communications link between the computers may be used.

Figure 14:
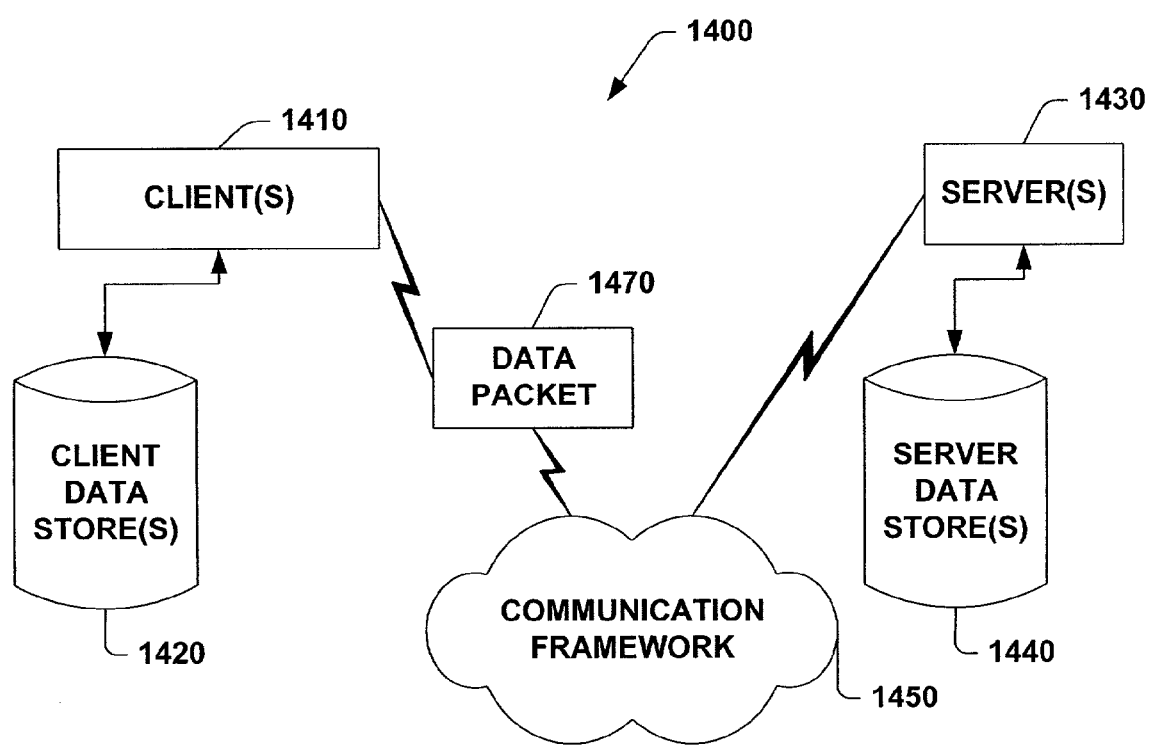
FIG. 14 is a schematic block diagram of an exemplary communication environment for a method performing in accordance with the present invention.

FIG. 14 is a schematic block diagram of a sample computing environment 1400 with which the present invention may interact. The system 1400 includes one or more clients 1410. The clients 1410 may be hardware and/or software (e.g., threads, processes, computing devices). The clients 1410 may house threads that desire to make asynchronous calls by employing the present invention, for example. The system 1400 also includes one or more servers 1430. The servers 1430 may also be hardware and/or software (e.g., threads, processes, computing devices). The servers 1430 may house threads to perform target methods that are to be called asynchronously by employing the present invention, for example. A client 1410 and a server 1430 may communicate, for example, via a data packet 1470. Since the client/server communication concerns the asynchronous operation of a synchronous method call on a target server method, the data packet 1470 may include, for example, a first field that holds information related to identifying the synchronously called target method and second fields that hold input parameters for the target method. Furthermore, the data packet 1470 may also include a third field that holds information related to a callback routine to be invoked when the target method completes and fourth fields for parameters returned from the synchronously called target method.

The system 1400 includes a communication framework 1450 that can be employed to facilitate communications between the clients 1410 and the servers 1430. Such a communication framework may house remoting features and/or a thread pool, for example. The clients 1410 are operably connected to one or more client data stores 1415 that can be employed to store information local to the clients 1410 (e.g., synchronous calling code, asynchronous calling code). Similarly, the servers 1430 are operably connected to one or more server data stores 1440 that can be employed to store information local to the servers 1430 (e.g., target methods).

Figure 15:
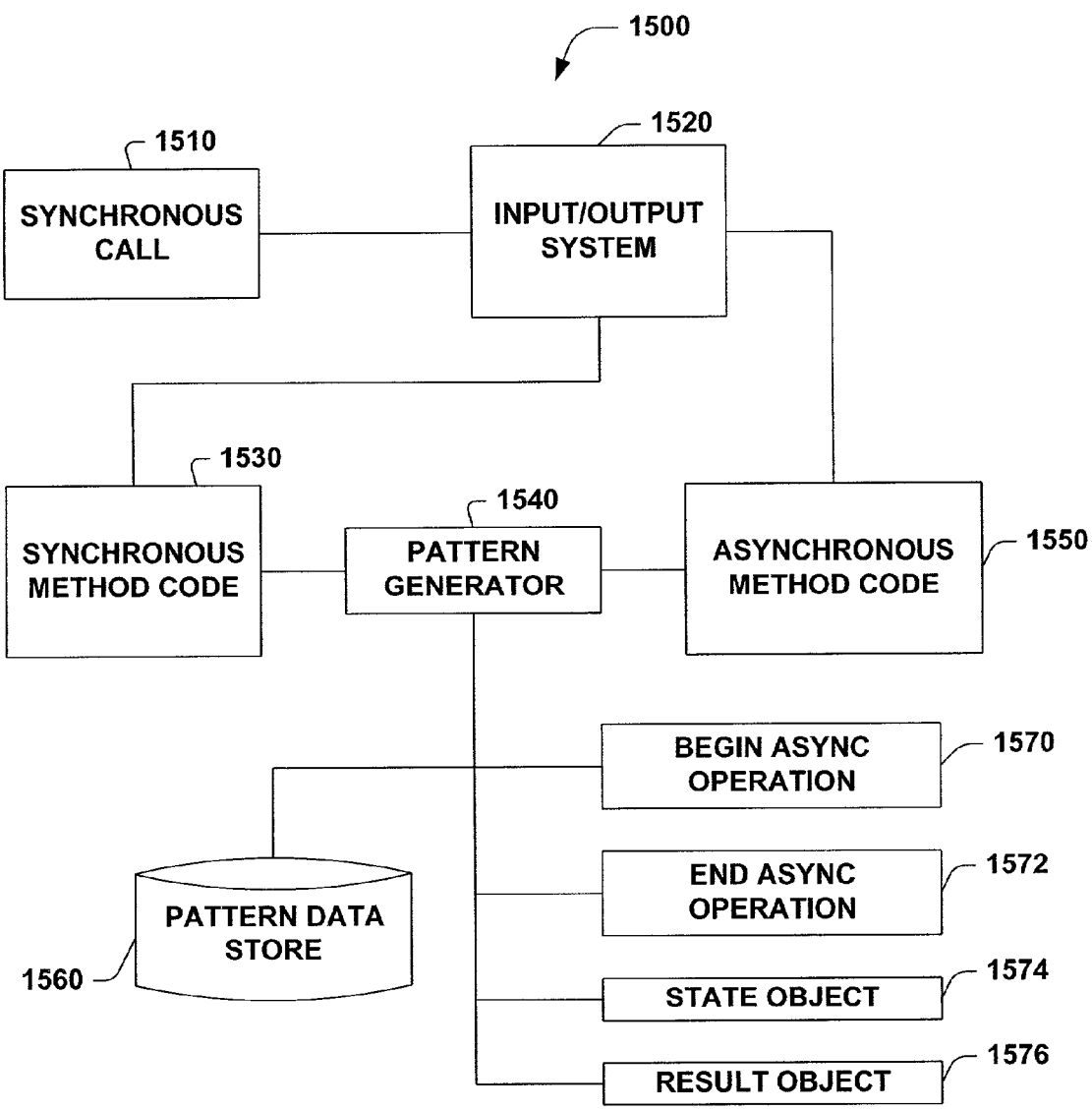
FIG. 15 is a schematic block diagram illustrating an example input/output application of the present invention.

Turning now to FIG. 15, one example of the operation of an input/output application 1500 employing asynchronous call code generated by the present invention is illustrated. A synchronous call 1510 may be presented to an input/output system 1520. The input/output system 1520 may have, for example, a stream base class and a stream subclass for a backing store (e.g., a file on a file system, a network connection, etc.) that can be opened in either synchronous or asynchronous mode. One problem with conventional systems is that typically a stream may only be opened for either synchronous or asynchronous input/output. Thus, there can be negative impacts on performance if an open method does not match an access method. But by employing a pattern generator 1540 provided by the present invention, a user may programmatically open a stream in one manner, with the pattern generator 1540 facilitating producing asynchronous method code 1550 related to synchronous method code 1530 that can account for mismatched open/access pairs thus allowing a client of the stream subclass to use the stream without having to know whether the stream was opened synchronously or asynchronously, which may improve system performance.

For example, the stream base class may have synchronous method code 1530 (e.g., int Read (byte[ ], int, int)) and the pattern generator 1540, acting upon the synchronous method code 1530 with data stored in the pattern data store 1560 may facilitate producing related asynchronous calling code by producing, for example, a begin async operation 1570 (e.g., IAsyncResult BeginRead(byte[ ], int, int, AsyncCallback, Object state)), an end async operation 1572 (e.g., int EndRead(IasyncResult ar)) a state object 1574 and a result object 1576. The stream subclass may provide an implementation of either the synchronous or asynchronous methods, and the stream base class default implementation may call the other methods. This facilitates authoring a stream subclass with support for asynchronous behavior without extraneous development.

Figure 16:
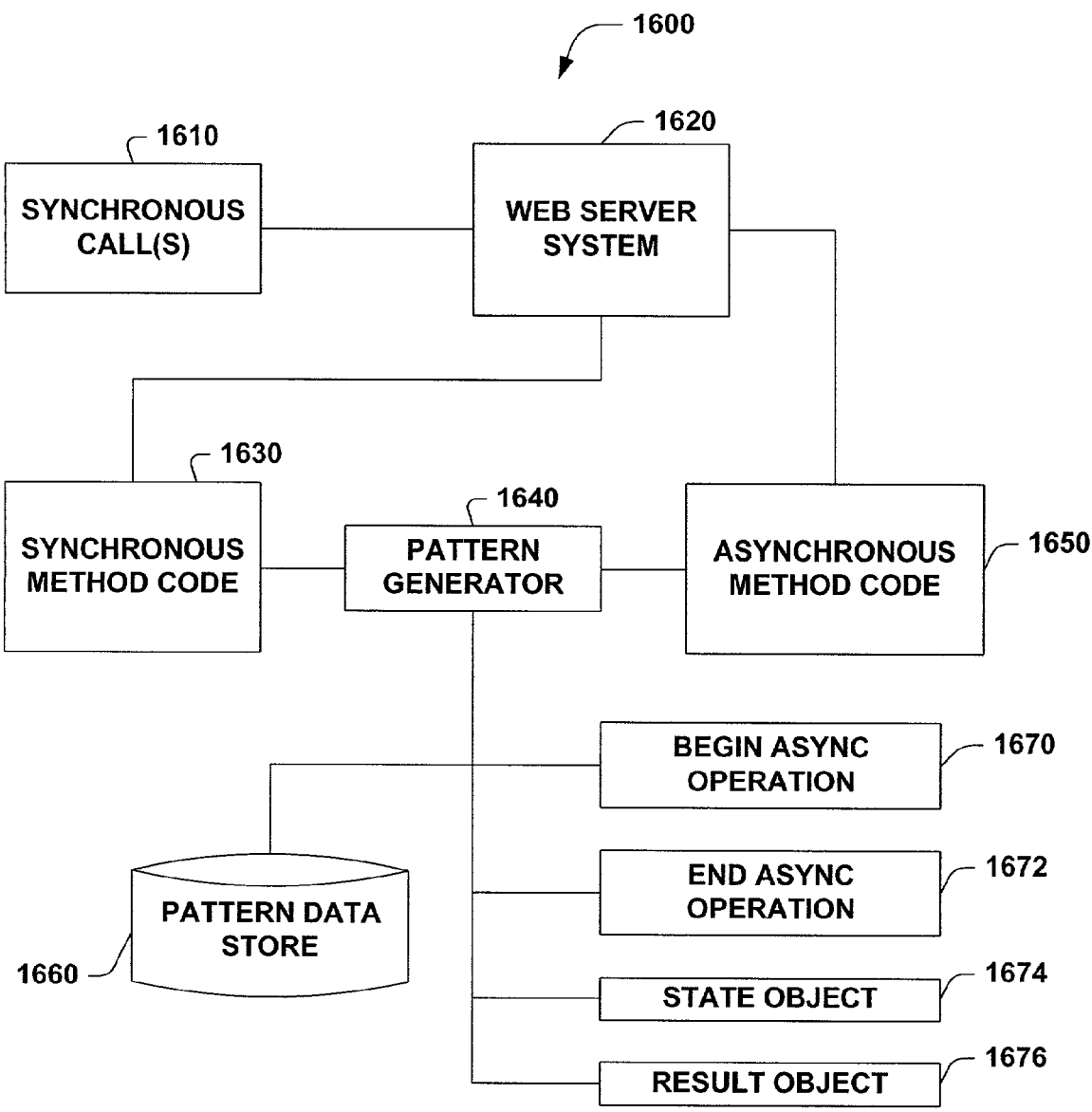
FIG. 16 is a schematic block diagram illustrating an example web server application of the present invention.

Turning now to FIG. 16, an example of the operation of a web server application 1600 employing asynchronous call code generated by the present invention is illustrated. A plurality of synchronous calls 1610 may be presented to a web server system 1620 to, for example, retrieve a number of images to be displayed on a web page. Acquiring such images may consume a period of time during which it would be beneficial to not have the calling entity blocked. The web server system 1620 may have, for example, a protocol handling base class that, due to the inherently synchronous nature of the web, only has synchronous calling capability via synchronous method code 1630. By employing a pattern generator 1640 provided by the present invention, a user may produce asynchronous method code 1650 related to the synchronous method code 1630 that can provide asynchronous calling capability to the previously synchronous bound class.

For example, the protocol handling base class may have synchronous method code 1630 (e.g., void ProcessRequest (HttpContext context)) and the pattern generator 1640, acting upon the synchronous method code 1630 with data stored in the pattern data store 1660 may facilitate producing related asynchronous calling code by producing, for example, a begin async operation 1670 (e.g., IAsyncResult BeginProcessRequest(HttpContext context, AsyncCallback cb, Object state)), an end async operation 1672 (e.g., void EndProcessRequest(IasyncResult ar)), a state object 1674 and a result object 1676. Thus, by employing the asynchronous method code 1650, a single thread could be employed to generate the plurality of image acquisition requests without having the thread block on each acquisition request, mitigating performance degradation associated with such serial blocking encountered in conventional systems.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for converting a synchronous method call on a target method to an asynchronous method call, the system comprising:
   a pattern generator that breaks the synchronous method call into one or more constituent parts; and
   a pattern data store connected to the pattern generator, the pattern data store stores data associated with converting the synchronous method call to the asynchronous method call,
   where the one or more constituent parts comprise at least one of: a begin asynchronous operation method; an end asynchronous operation method; an asynchronous call state object; and
   an asynchronous call result object,
   where the begin asynchronous operation method returns an asynchronous result object and accepts as inputs at least one of: input parameters presented to the target method; input/output parameters presented to the target method; parameters passed by reference to the target method; an address of an asynchronous callback routine; and the asynchronous call state object,
   where the end asynchronous operation method accepts as inputs at least one of: input/output parameters presented to the target method; output parameters presented to the target method; parameters passed by reference to the target method; and the asynchronous call result object, and
   where the asynchronous call result object comprises: a first field that holds information concerning whether the begin asynchronous operation method completed asynchronously; and a second field that holds information concerning whether a server completed processing the target method.

2. The system of claim 1, where the asynchronous call result object provides a waitable object.

3. The system of claim 2, where the asynchronous call result object implements an interface, the interface comprising at least one of:
   an asynchronous call state object get method;
   a wait handler object get method;

a synchronous call completed field get method; and
a target method call completed field get method.

4. The system of claim 3, where the end asynchronous operation method is invoked by one of:
   an asynchronous call result poller;
   the begin asynchronous operation method;
   an asynchronous call result waiter; and
   an asynchronous callback routine.

5. The system of claim 4 where the asynchronous call result poller polls the asynchronous call state object to determine whether the server has completed processing the target method.

6. The system of claim 4 where the asynchronous call result waiter periodically sleeps and wakes up, where during an awakened period the asynchronous call result waiter is operable to determine whether the server has completed the target method by examining the asynchronous call result object.

7. The system of claim 4 where the asynchronous callback routine is invoked when the server has completed the target method.

8. The system of claim 1, where the pattern generator can convert method calls associated with at least one of file input/output, stream input/output, socket input/output, networking, remoting channels, proxies, web forms, web services and messaging message queues.

9. The system of claim 1, where the pattern generator can convert method calls associated with file input/output, stream input/output, socket input/output, networking, remoting channels, proxies, web forms, web services and messaging message queues.

10. A system to facilitate making asynchronous calls on a target method, the system comprising:
    a synchronous method call code associated with a client caller, the synchronous method call code is broken into one or more constituent parts,
    where the one or more constituent parts comprise at least one of: a begin asynchronous operation method; an end asynchronous operation method; an asynchronous call state object; and an asynchronous call result object, and
    where the asynchronous call result object comprises: a first field that holds information concerning whether the begin asynchronous operation method completed asynchronously; and a second field that holds information concerning whether a server completed processing the target method;
    an asynchronous call initializer that accepts input parameters from the client caller and forwards the input parameters towards the target method, the asynchronous call initializer further establishes a callback routine, where the callback routine can be invoked upon completion of the target method, the asynchronous call initializer further accepts a state object and populates one or more fields in the state object with state values associated with the asynchronous call, the asynchronous call initializer further returns a result object to the client caller;
    an asynchronous call completer that accepts results generated by the target method and supplies the results to the client caller, the asynchronous call completer further updates the state object, the asynchronous call completer further updates the result object; and
    a state tracker that tracks and logs state related to processing associated with the asynchronous call initializer, the asynchronous call completer and the target method, the state tracker further updates the state object.

11. A computer readable medium storing computer executable instructions that performs a method for converting a code for a synchronous method call on a target method to a code for an asynchronous method call, the method comprising:
    receiving the code for the synchronous method call;
    passing the code for the synchronous method call through a call conversion process to produce the code for the asynchronous method call, where the call conversion process comprises: subdividing the code for the synchronous method call into constituent parts; and creating one or more asynchronous method call code segments corresponding to the constituent parts;
    creating an asynchronous call result object to store results associated with the asynchronous method call;
    creating an asynchronous call state object to store state information associated with the asynchronous method call;
    where the constituent parts comprise at least one of:
      a begin operation that will not block due to asynchronous method calling; and
      an end operation that will not block due to asynchronous method calling;
    where the end operation is invoked by one of:
      processing associated with polling a field in the asynchronous call state object;
      processing associated with waiting on the asynchronous call result object;
      the begin operation; and
      an asynchronous callback routine;
    where code for synchronous method calls is associated with at least one of file input/output, stream input/output, socket input/output, networking, remoting channels, proxies, web forms, web services and messaging message queues can be converted; and
    where the asynchronous call result object comprises: a first field that holds information concerning whether the begin asynchronous operation completed asynchronously; and a second field that holds information concerning whether a server completed processing the target method.

12. A computer readable medium storing computer executable instructions for a method for converting code for a synchronous method call on a target method to code for an asynchronous method call, the method comprising:
    dividing the synchronous method call into at least one of a non-blocking asynchronous begin operation and a non-blocking asynchronous end operation; and
    associating a call state object to at least one of the non-blocking asynchronous begin operation and the non-blocking asynchronous end operation;
    where a begin asynchronous operation method returns an asynchronous result object and accepts as inputs at least one of: input parameters presented to the target method; input/output parameters presented to the target method; parameters passed by reference to the target method; an address of an asynchronous callback routine; and an asynchronous call state object,
    where the end asynchronous operation method accepts as inputs at least one of: input/output parameters presented to the target method; output parameters presented to the target method; parameters passed by reference to the target method; and the asynchronous call result object, and
    where the asynchronous call result object comprises: a first field that holds information concerning whether the begin asynchronous operation method completed asynchronously; and a second field that holds information concerning whether a server completed processing the target method.

13. A computer readable medium storing computer executable instructions that performs a method for facilitating asynchronous method calls on a target method, the method comprising:
    providing a synchronous method call code broken into constituent parts;
    receiving a request from a calling client to perform processing associated with beginning an asynchronous call to a target method;
    initializing a state tracking object;
    initializing a result object;
    queuing a call to the target method, where the call is queued in a thread pool;
    returning control and a result object to the calling client;
    receiving a request from the calling client to perform processing associated with ending the asynchronous call to the target method;
    returning control and a result consistent with the result of the target method to the calling client upon completion of the processing associated with ending the asynchronous call to the target method;
    where the constituent parts comprise at least one of:
        a begin operation that will not block due to the asynchronous call; and
        an end operation that will not block due to the asynchronous call;
    where the begin operation returns the result object and accepts as inputs at least one of: input parameters presented to the target method; input/output parameters presented to the target method; parameters passed by reference to the target method; an address of an asynchronous callback routine; and a call state object,
    where the end operation accepts as inputs at least one of: input/output parameters presented to the target method; output parameters presented to the target method; parameters passed by reference to the target method; and the asynchronous call result object, and
    where the result object comprises: a first field that holds information concerning whether the begin operation completed asynchronously; and a second field that holds information concerning whether a server completed processing the target method.

14. The method of claim 13 where the request from the calling client to perform processing associated with ending the asynchronous call to the target method is controlled by one of a polling process and a waiting process.

15. A computer readable medium storing computer executable instructions that performs a method for facilitating asynchronous method calls to a target method, the method comprising:
    examining a synchronous method call code and breaking the code into constituent parts;
    accepting one or more requests from a caller to begin an asynchronous call to a target method;
    initializing at least one of a state tracking object and a result object;
    queuing a call to the target method;
    accepting one or more requests to end the asynchronous call to the target method;
    sending at least one of a result and a result object to the caller;
    where the constituent parts comprise at least one of:
        a begin operation that will not block due to an asynchronous method calling; and
        an end operation that will not block due to the asynchronous method calling;
    where the begin operation returns the result object and accepts as inputs at least one of: input parameters presented to the target method; input/output parameters presented to the target method; parameters passed by reference to the target method; an address of an asynchronous callback routine; and an asynchronous call state object,
    where the end operation accepts as inputs at least one of: input/output parameters presented to the target method; output parameters presented to the target method; parameters passed by reference to the target method; and an asynchronous call result object, and
    where the asynchronous call result object comprises: a first field that holds information concerning whether the begin operation completed asynchronously; and a second field that holds information concerning whether a server completed processing the target method.

16. A computer readable medium storing computer executable instructions that performs a method for facilitating asynchronous method calls to a target method, the method comprising:
    providing a synchronous method call code broken into constituent parts;
    receiving a request from a calling client to perform processing associated with beginning an asynchronous call to a target method;
    identifying a target method called by a synchronous method call;
    initializing a state tracking object;
    establishing a callback routine, where the callback routine will be invoked upon notification of the completion of the target method, and where the callback routine will invoke processing associated with ending the asynchronous call to the target method;
    queuing a call to the target method, where the call is queued in a thread pool;
    returning and storing control parameters and a result object to the calling client;
    invoking the callback routine upon receiving notification of the completion of the target method;
    performing processing associated with ending the asynchronous call to the target method; and
    returning and storing control parameters and a result object consistent with the result of the target method to the calling client upon completion of the processing associated with asynchronous call to the target method.

17. A system for converting a synchronous method call to an asynchronous method call, the system comprising:
    means for accepting instructions to call a target method synchronously;
    means for generating instructions to call the target method asynchronously;
    means for generating an object to store results generated in response to performing the instructions to call the target method asynchronously;
    means for generating an object to store state information associated with performing the instructions to call the target method asynchronously;
    means for identifying the target method called by the synchronous method call;
    means for storing parameters intended for the target method;
    means for invoking a callback routine when the target method completes; and
    means for returning and storing parameters from the target method.

* * * * *